(12) United States Patent  (10) Patent No.: US 8,570,338 B2
Mizukura et al.  (45) Date of Patent: Oct. 29, 2013

(54) INFORMATION PROCESSING DEVICE AND METHOD, AND PROGRAM

(75) Inventors: Takami Mizukura, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 840 days.

(21) Appl. No.: 12/462,667

(22) Filed: Aug. 6, 2009

(65) Prior Publication Data

US 2010/0039443 A1 Feb. 18, 2010

(30) Foreign Application Priority Data

Aug. 8, 2008 (JP) ................................ P2008-205151

(51) Int. Cl.
*G09G 5/02* (2006.01)
(52) U.S. Cl.
USPC ........... 345/590; 345/589; 345/591; 345/600; 345/601; 382/162; 358/518
(58) Field of Classification Search
None
See application file for complete search history.

(56) References Cited

U.S. PATENT DOCUMENTS

| 5,933,253 | A | 8/1999 | Ito et al. |
| 6,560,356 | B1 | 5/2003 | Takahashi et al. |
| 6,618,499 | B1 | 9/2003 | Kohler et al. |
| 7,009,734 | B2 * | 3/2006 | Suwa et al. ............... 358/1.9 |
| 2006/0170999 | A1 | 8/2006 | Sloan et al. |

FOREIGN PATENT DOCUMENTS

| EP | 1432237 A2 | 6/2004 |
| EP | 2071823 A2 | 6/2009 |
| JP | 09-098298 A | 4/1997 |
| JP | 9-135360 A | 5/1997 |
| JP | 10178557 A | 6/1998 |
| JP | 2000050091 A | 2/2000 |
| JP | 2002033936 A | 1/2002 |
| JP | 2003304554 A | 10/2003 |
| JP | 3712424 B2 | 8/2005 |
| JP | 2006332761 A | 12/2006 |
| JP | 2007166403 A | 6/2007 |
| WO | WO-99/55074 A1 | 10/1999 |
| WO | 2008066248 A1 | 6/2008 |

OTHER PUBLICATIONS

Communication from EP Application No. 09167397, dated Aug. 1, 2011.
International Search Report issued in connection with corresponding European Application No. EP 09 16 7397 on Aug. 6, 2010.
Office Action from Japanese Application No. 2008-205151, dated Jul. 29, 2010.
Office Action from Japanese Application No. 2008-205151, dated Aug. 7, 2012.
HDMI Licensing LLC, High-Definition Multimedia Interface Specification Version 1.3, Jun. 22, 2006.
Office Action from Japanese Application No. 2008-205151, dated Oct. 18, 2012.

* cited by examiner

*Primary Examiner* — Antonio A Caschera
(74) *Attorney, Agent, or Firm* — Lerner, David, Littenberg, Krumholz & Mentlik, LLP

(57) ABSTRACT

An information processing device includes: a color gamut information generating unit configured to generate color gamut information representing the color gamut of image data based on table information indicating the highest chroma point at each equal hue plane regarding a plurality of equal hue planes.

14 Claims, 30 Drawing Sheets

FIG. 5

| INDEX | 0 | 1 | 2 | 3 | 4 |
|---|---|---|---|---|---|
| COLOR GAMUT INFORMATION TO MEAN | Input device | sRGB | Adobe RGB | Wide RGB | DCI-P3 |

101

| CASE OF sRGB | x | y |
|---|---|---|
| RED (R) | 0.6400 | 0.3300 |
| GREEN (G) | 0.3000 | 0.6000 |
| BLUE (B) | 0.1500 | 0.0600 |
| WHITE POINT | 0.3127 | 0.3290 |

111

● : INSIDE OF COLOR GAMUT, Flag = 1

○ : OUTSIDE OF COLOR GAMUT, Flag = 0

FIG. 8

| L* | a* | b* | Gamut flag |
|---|---|---|---|
| 100 | 0 | 0 | 1 |
| 100 | 0 | 16 | 0 |
| 100 | 0 | 32 | 0 |
| ... | ... | ... | ... |
| 90 | 0 | 0 | 1 |
| 90 | 0 | 16 | 1 |
| 90 | 0 | 32 | 1 |
| ... | ... | ... | ... |
| ... | ... | ... | ... |
| 10 | 0 | 0 | 1 |
| 10 | 0 | 16 | 1 |
| 10 | 0 | 32 | 1 |
| ... | ... | ... | ... |
| 0 | 128 | 96 | 0 |
| 0 | 128 | 112 | 0 |
| 0 | 128 | 128 | 1 |

| 141 COORDINATES OF VERTEX | | | | 142 VERTEX NUMBER OF POLYGON TRIANGLE | | |
|---|---|---|---|---|---|---|
| No. | L* | a* | b* | | | |
| 1 | 37.3033 | 13.6957 | 15.5657 | 24 | 13 | 15 |
| 2 | 66.2 | 14.4717 | 17.7434 | 24 | 16 | 14 |
| 3 | 50.781 | -1.4686 | -21.2625 | 18 | 24 | 14 |
| 4 | 42.7402 | -16.2955 | 22.3462 | 24 | 18 | 13 |
| 5 | 56.4673 | 11.5232 | -24.3957 | 13 | 17 | 15 |
| 6 | 71.3713 | -31.3888 | 1.9861 | 19 | 17 | 13 |
| 7 | 61.0684 | 31.1301 | 57.1671 | 16 | 11 | 14 |
| 8 | 40.8278 | 15.4022 | -41.8841 | 11 | 16 | 19 |
| 9 | 50.9515 | 45.9257 | 15.089 | 7 | 17 | 19 |
| 10 | 30.695 | 23.9062 | -22.071 | 7 | 24 | 15 |
| 11 | 72.0006 | -27.1796 | 58.0373 | 24 | 7 | 16 |
| 12 | 71.6424 | 15.3279 | 65.8884 | 6 | 18 | 14 |
| 13 | 29.986 | 24.6141 | -50.8621 | 18 | 6 | 19 |
| 14 | 55.6554 | -41.6803 | 34.778 | 11 | 6 | 14 |
| 15 | 40.9369 | 52.8535 | 25.6102 | 6 | 11 | 19 |
| 16 | 81.6409 | -1.5714 | 79.4793 | 8 | 19 | 13 |
| 17 | 50.9996 | 49.4311 | -15.036 | 18 | 8 | 13 |
| 18 | 51.6863 | -24.7227 | -25.9783 | 8 | 18 | 19 |
| 19 | 95.4648 | -0.3511 | 0.7838 | 16 | 12 | 19 |
| 20 | 80.9526 | 0.147 | 0.138 | 12 | 7 | 19 |
| 21 | 66.38 | 0.0511 | -0.0672 | 7 | 12 | 16 |
| 22 | 52.1808 | 0.0617 | -0.0821 | 17 | 9 | 15 |
| 23 | 36.4781 | -0.1875 | -0.472 | 9 | 7 | 15 |
| 24 | 21.4126 | -0.032 | -0.9451 | 7 | 9 | 17 |

COLOR GAMUT POLYGON SPECIFICATION

FIG. 10 _151

| | INDEX SPECIFICATION | CHROMATICITY SPECIFICATION | 3D-LUT SPECIFICATION | POLYGON SPECIFICATION |
|---|---|---|---|---|
| CAPACITY | ◎ i) EXPRESSIBLE WITH ONLY ONE NUMERIC VALUE, WHEREBY CAPACITY CAN BE SUPPRESSED TO MINIMAL CAPACITY  ii) COMMUNICATION LOAD FOR EXCHANGE OF COLOR GAMUT INFORMATION FOR COMMUNICATION IS ALSO SMALL | ○ i) DESCRIPTION IS RESTRICTED TO ONLY THE CHROMATICITY INFORMATION OF BASIC PRIMARY COLORS, THEREBY SUPPRESSING CAPACITY AND COMMUNICATION LOAD | △× i) EVEN IN THE CASE OF EXPRESSING RGB DISPLAY DEVICE CAPABLE OF EXPRESSING WITH "CHROMATICITY SPECIFICATION", CAPACITY AT OR ABOVE TEN TIMES IS NECESSARY  ii) THE MORE COMPLICATED THE SHAPE TO BE EXPRESSED IS, THE GREATER CAPACITY BECOMES | △× i) SIMILAR TO THE LEFT |
| EXPRESSIBLE SHAPE | △ i) RESTRICTED TO GENERALLY KNOWN COLOR SPACE  ii) RESTRICTED TO STANDARD COLOR SPACE OF GENERALLY RGB SYSTEM | △ i) LIKE DISPLAY DEVICE, RESTRICTED TO A DEVICE WHEREBY ADDITIVE COLOR MIXING PROPERTY IS REALIZED  ii) RESTRICTED TO THE COLOR SPACE OF GENERALLY RGB SYSTEM | ○ i) IN ADDITION TO THE DEVICE EXPRESSIBLE WITH "INDEX SPECIFICATION" OR "CHROMATICITY SPECIFICATION", A PRINTING DEVICE OF SUBTRACTIVE COLOR MIXING BASE WHEREBY COLOR GAMUT OF COMPLICATED SHAPE CAN BE EXPRESSED | ◎ i) THOUGH GENERALLY SIMILAR TO THE LEFT, THE SHAPE CAN BE EXPRESSED DIRECTLY WITH PLANES, SO THE SHAPE CAN BE EXPRESSED SMOOTHLY MORE PRECISELY THAN 3D-LUT SPECIFICATION |
| AFFINITY TO COLOR GAMUT COMPRESSION ALGORITHM | △ i) CALCULATION OF HIGHEST CHROMA POINT (Cusp) HAS A LOT OF TROUBLE AT THE TIME OF SHAPE CALCULATION OF EQUAL HUE PLANE | △ i) CALCULATION OF HIGHEST CHROMA POINT (Cusp) HAS A LOT OF TROUBLE AT THE TIME OF SHAPE CALCULATION OF EQUAL HUE PLANE | × i) IN ORDER TO CALCULATE EQUAL HUE INFORMATION FROM A 3D TABLE, VERY COMPLICATED CALCULATION IS NECESSARY SUCH THAT EQUAL HUE INFORMATION IS OBTAINED FROM THE EQUAL HUE INFORMATION OF EACH LATTICE BY INTERPOLATION | × i) IN ORDER TO CALCULATE THE INFORMATION OF A SIDE OF AN EQUAL HUE REGION FROM A POLYGON SOLID, COMPLICATED CALCULATION IS NECESSARY SUCH AS CONVERSION CALCULATION FROM PLANE INFORMATION, INTERPOLATION OF EQUAL HUE PLANE INFORMATION, OR THE LIKE |

FIG. 11C
| REPRESENTATIVE COLOR | Y | C | H |
|---|---|---|---|
| MAGENTA | 0.412 | 0.532 | 52 |
| RED | 0.300 | 0.525 | 108 |
| YELLOW | 0.885 | 0.505 | 171 |
| GREEN | 0.588 | 0.532 | 232 |
| CYAN | 0.699 | 0.525 | 288 |
| BLUE | 0.115 | 0.506 | 351 |
FIG. 11D
| REPRESENTATIVE COLOR | Y | Cb | Cr |
|---|---|---|---|
| MAGENTA | 0.412 | 0.328 | 0.419 |
| RED | 0.300 | -0.162 | 0.499 |
| YELLOW | 0.885 | -0.499 | 0.079 |
| GREEN | 0.588 | -0.328 | -0.419 |
| CYAN | 0.699 | 0.162 | -0.499 |
| BLUE | 0.115 | 0.499 | -0.079 |
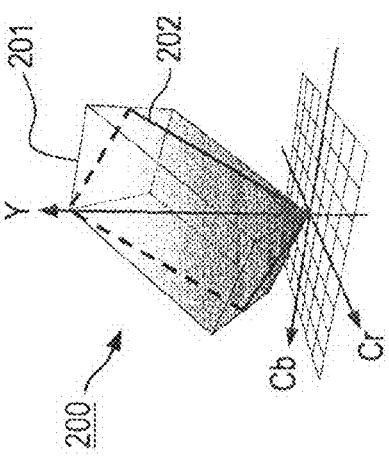
FIG. 11A
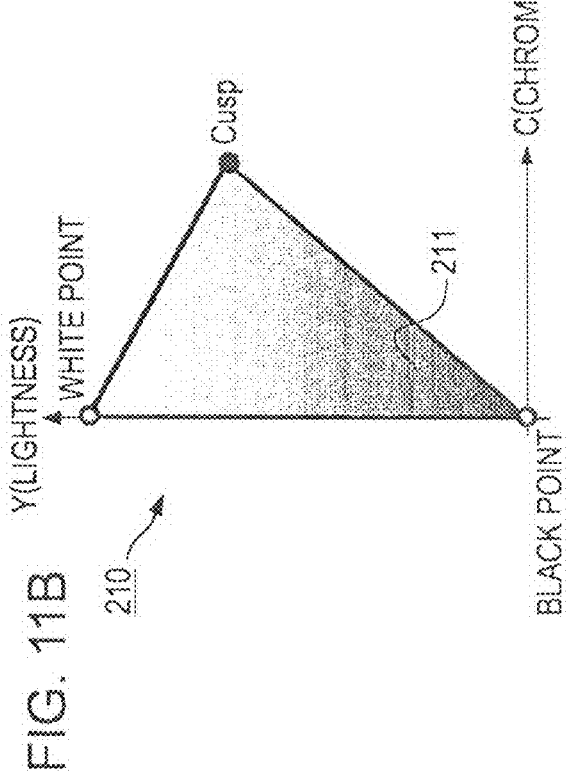
FIG. 11B

FIG. 13

| | Cusp TABLE SPECIFICATION |
|---|---|
| CAPACITY | ○ i) THOUGH DEPENDING ON HUE INTERVAL PRECISION, AS COMPARED TO "3D-LUT SPECIFICATION" AND "POLYGON SPECIFICATION", DESCRIPTION CAN BE PERFORMED WITH EXTREMELY SMALL CAPACITY<br>ii) COMMUNICATION LOAD OF EXCHANGE OF COLOR GARMUT WITH COMMUNICATION IS NOT SO GREAT |
| EXPRESSIBLE SHAPE | ○ i) IN ADDITION TO KNOWN COLOR SPACE AND ADDITIVE COLOR MIXING SYSTEM RGB DEVICE COLOR GAMUT, A SYNTHETIC COLOAR GAMUT MADE UP OF SEVERAL COLOR GAMUTS CAN BE EXPRESSED SUCH AS A TEMPORARY OUTPUT DEVICE COLOR GAMUT<br>ii) COMPLICATED SHAPED COLOR GAMUT LIKE SUBTRACTIVE COLOR MIXING DEVICE FAILS TO BE EXPRESED COMPLETELY, BUT AS COMPARED TO "3D-LUT SPECIFICATION", A COLOR GAMUT SHAPE CAN BE EXPRESSED WITH HIGH PRECISION REGARDING A ADDITIVE COLOR MIXING SYSTEM RGB DEVICE |
| AFFINITY TO COLOR GAMUT COMPRESSION ALGORITHM | ◎ i) Cusp INFORMATION IS ORIGINALLY DIRECTLY INCLUDED, SO TWO-DIMENSIONAL COLOR GAMUT EXPRESSION OF EQUAL HUE PLANE CAN BE READILY PERFORMED, AND A COLOR GAMUT COMPRESSION ALGORITHM CAN BE READILY EMPLOYED |

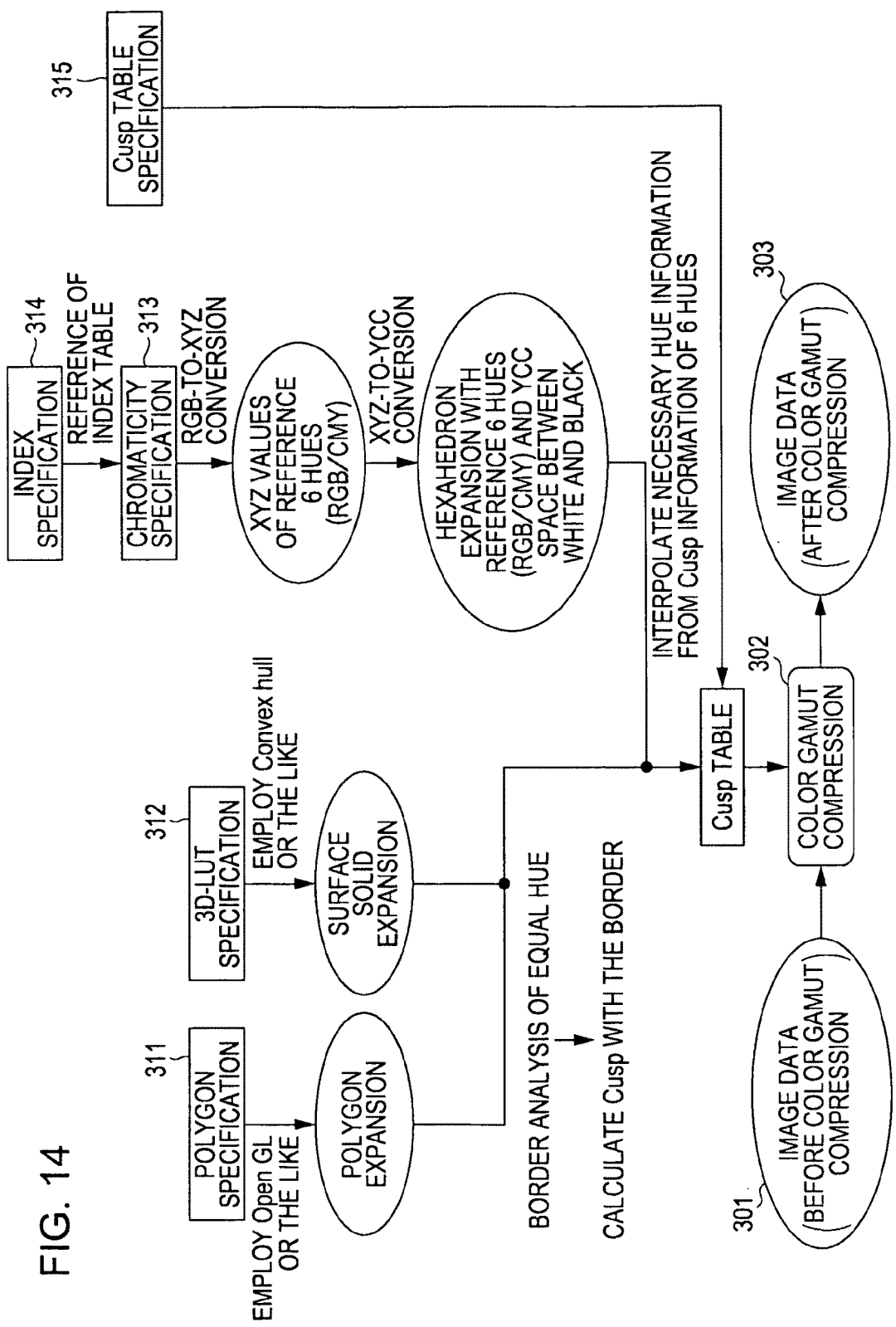

FIG. 20A

| Value | 0 | 1 | 2 | 3 | ... | xxx | FFFF |
|---|---|---|---|---|---|---|---|
| MEANING | Input device | sRGB | Adobe RGB | Wide RGB | ... | xxxRGB | OTHER COLOR GAMUT FORMATS |

481

HEDAR 460
Value (64 BITS) — 461
Address (64 BITS) — 462

| COLOR GAMUT FORMAT | Value | Address |
|---|---|---|
| CASE OF INDEX SPECIFICATION | SET TO A NUMERIC VALUE EQUIVALENT TO INDEX. ASSIGN STANDARD COLOR SPACE TO EACH NUMERIC VALUE FROM 0 TO XXX. | SET TO "0" (UNUSED). |
| CASES OF OTHER SPECIFICATIONS | SET TO "FFFF". IMPLICATED SUCH THAT A COLOR GAMUT FORMAT OTHER THAN INDEX SPECIFICATION IS EMPLOYED. | SET TO THE ADDRESS OF A 64-BIT NUMERIC VALUE WHERE COLOR GAMUT INFORMATION IS ACTUALLY STORED. |

| Y | Cb | Cr |
|---|---|---|
| 0.151 | 0.468 | -0.001 |
| 0.192 | 0.445 | 0.078 |
| 0.226 | 0.426 | 0.155 |
| .. | .. | .. |

502

| Y | C |
|---|---|
| 0.151 | 0.469 |
| 0.192 | 0.453 |
| 0.226 | 0.454 |
| .. | .. |

503

| Y | \|Cb\| or \|Cr\| |
|---|---|
| 0.151 | 0.001 |
| 0.192 | 0.078 |
| 0.226 | 0.155 |
| .. | .. |

504

| H | Y | Cb | Cr |
|---|---|---|---|
| 0 | 0.151 | 0.468 | -0.001 |
| 10 | 0.192 | 0.445 | 0.078 |
| 20 | 0.226 | 0.426 | 0.155 |
| .. | .. | .. | .. |

505

| H | Y | C |
|---|---|---|
| 0 | 0.151 | 0.469 |
| 10 | 0.192 | 0.453 |
| 20 | 0.226 | 0.454 |
| .. | .. | .. |

506

| H | Y | \|Cb\| or \|Cr\| |
|---|---|---|
| 0 | 0.151 | 0.001 |
| 10 | 0.192 | 0.078 |
| 20 | 0.226 | 0.155 |
| .. | .. | .. |

FIG. 23

| Byte # | 7 | 6 | 5 | 4 | 3 | 2 | 1 | 0 |
|---|---|---|---|---|---|---|---|---|
| 1 | 0 | C-flag | | | | Color Space | | |
| 2 | HueNum | | | | | | | |
| 3 | H-flag | | | | | | | |
| 4 | 0 | CompSize | | | | CompNum | | |
| 5 | Cusp Table Data | | | | | | | |
| 6 | | | | | | | | |
| 7 | | | | | | | | |
| 8 | | | | | | | | |
| 9 | | | | | | | | |
| ... | | | | | | | | |
| (CompNum × CompSize × HueNum)−4 | | | | | | | | |

| COLOR SPACE NAME | BIT ASSIGNMENT (4 BITS) |
|---|---|
| sYCC | 0000 |
| xvYCC601 | 0001 |
| xvYCC709 | 0010 |
| YIQ | 0011 |
| YUV | 0100 |
| $YP_BP_R$ | 0101 |
| $YC_BC_R$ | 0110 |
| CIELAB | 0111 |
| CIELUV | 1000 |
| HSV | 1001 |
| HLS | 1010 |
| ⋮ | ⋮ |
| ⋮ | ⋮ |

FIG. 25

| TYPE OF CHROMA INFORMATION | | BIT ASSIGNMENT (3 BITS) |
|---|---|---|
| Color Space: LIGHTNESS AND COLOR DIFFERENCE BASE | $C = sqrt(C1^2 + C2^2)$ | 000 |
| Color Space: LIGHTNESS AND COLOR DIFFERENCE BASE | C = EMPLOY C1 AND C2 WITHOUT CHANGE | 001 |
| Color Space: LIGHTNESS AND COLOR DIFFERENCE BASE | C = EMPLOY abs(C1) OR abs(C2) | 010 |
| Color Space: HUE, LIGHTNESS, AND COLOR DIFFERENCE BASE | C = CHROMA INFORMATION IS EMPLOYED WITHOUT CHANGE | 011 |
| .. | | .. |

| | H-flag | | C-flag | | | | LIGHTNESS INFORMATION |
|---|---|---|---|---|---|---|---|
| | | 1 | 000 | 001 | 010 | 011 | — |
| | 0 | 1 | 1 | 2 | 1 | 1 | 1 |
| NUMBER OF FACTORS | 0 | | | | | | |
| SMALL TOTAL | H_CompNum | | C_CompNum | | | | Y_CompNum=1 |

541

CompNum = H_CompNum + C_CompNum + 1

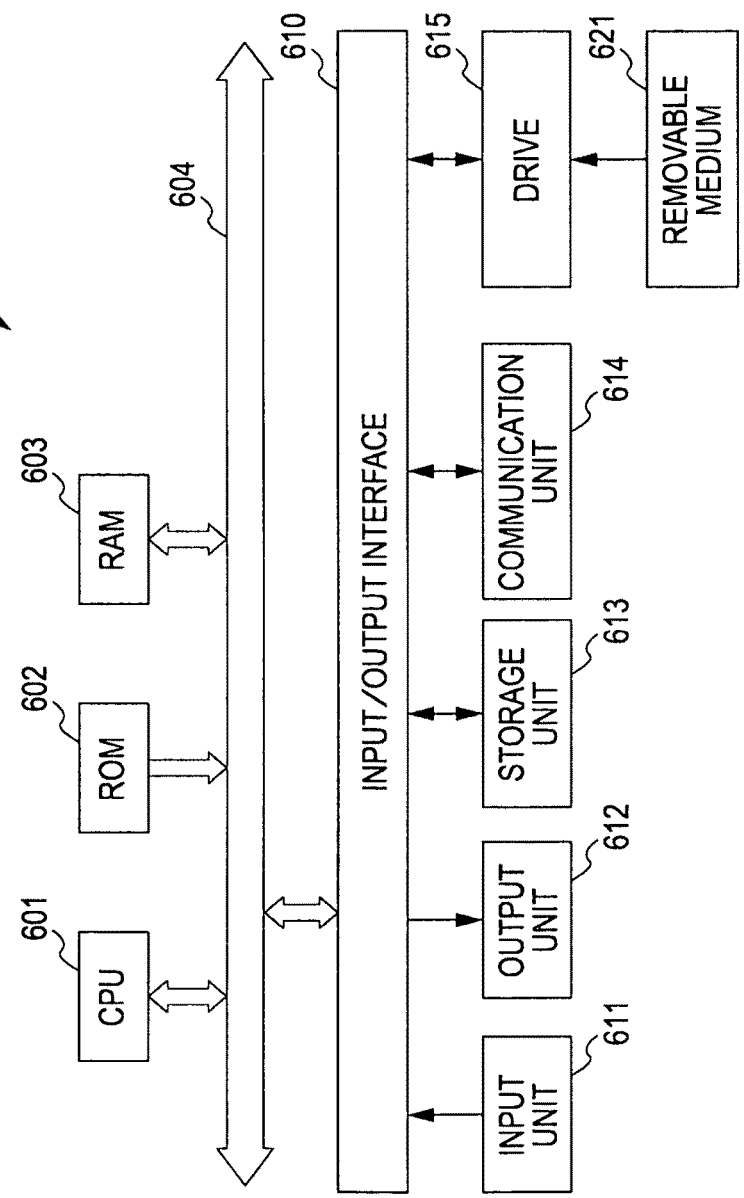

INFORMATION PROCESSING DEVICE AND METHOD, AND PROGRAM

CROSS-REFERENCE TO RELATED APPLICATION

The present application claims priority from Japanese Patent Application No. JP 2008-205151 filed in the Japanese Patent Office on Aug. 8, 2008, the entire content of which is incorporated herein by reference.

BACKGROUND OF THE INVENTION

1. Field of the Invention

The present invention relates to an information processing device and method, and program, and specifically, relates to an information processing device and method, and program whereby a color gamut more suitable for image data to be processed can be provided.

2. Description of the Related Art

In recent years, there are more and a wider variety of digital image devices of which the color expression regions differ. In particular, color gamut expansion of image display devices is remarkable. The color gamut has been markedly expanded during the process from CRT (Cathode Ray Tube) displays, plasma displays, LCDs (Liquid Crystal Display), and further to organic Electro Luminescence Displays (OELD), for example. Heretofore, a workflow based on SRGB (standard RGB), which is the standard color space of existing PC monitors, has been proposed as a method for matching colors for output among devices having different color gamuts. However, a great number of imaging apparatuses, such as digital still cameras, video cameras, and so forth, which can image colors outside the SRGB color gamut, have come onto the scene.

Thus, with a system exchanging image data between devices which can handle various types of color gamut, there is a case where color gamut conversion of image data (compression or expansion, i.e., color matching) has to be performed. For example, in a case where an image of imaged wide color gamut image data is output at various types of color gamut device including a wide color gamut display, it is demanded to output a high chroma color outside the color gamut more naturally. Particularly, high-lightness and high-chroma colors have to be output smoothly while suppressing hue distortion, a phenomena wherein hue changes undesirably while chroma remains unchanged.

Therefore, there has been a method wherein information indicating the color gamut of image data to be exchanged between devices is exchanged along with image data thereof, and accordingly, color matching can be executed at each device.

For example, as shown in FIG. 1, in a case where image data is transmitted from a sending terminal (source) 1 to a receiving terminal (sink) 2, when the color gamuts (color expressible regions) of the sending terminal 1 and receiving terminal 2 differ from each other, color gamut conversion has to be performed. This color gamut conversion may be performed at either the sending terminal 1 or receiving terminal 2. For example, as shown in an arrow 3, an arrangement may be made wherein color gamut information 5 indicating the color gamut of the sending terminal 1 is supplied to the receiving terminal 2 along with image data, and color gamut conversion is performed at the receiving terminal 2. Also, as shown in an arrow 4, an arrangement may be made wherein the sending terminal 1 obtains color gamut information 6 indicating the color gamut of the receiving terminal 2 from the receiving terminal 2, and converts the color gamut of image data to transmit this.

Color gamut conversion is performed based on the difference of the two color gamuts of the color gamut of the transmission source device and the color gamut of the transmission destination device of image data. In the case of the example in FIG. 1, color gamut conversion is performed by employing both of the color gamut information 5 of the sending terminal 1 and the color gamut information 6 of the receiving terminal 2.

For example, as shown in FIG. 2, color gamut compression has to be performed upon a portion where the color gamut 11 of the sending terminal 1 is narrower than the color gamut 12 of the receiving terminal 2 (portion surrounded with a curve 13). In general, a color gamut is compressed by a method for changing chroma and lightness so as to conserve the hue thereof.

Upon color gamut compression not being performed, a color outside the color gamut of the receiving terminal 2 (e.g., a high chroma color) but within the gamut of the sending terminal 1 is expressed with the edge color of the color gamut of the receiving terminal forcibly (natural clip or simple clip). For example, as to a color gamut (RGB space) such as shown in FIG. 3A, the original data existing outside the color gamut thereof is expressed with a color gamut edge (clip data) such as shown in FIG. 3B. As a result thereof, a phenomenon occurs such as hue distortion, for example, wherein the color of an image where the sky is gradually dawning changes toward yellow or the like, and accordingly, there is a possibility that the image may become very unnatural visually.

Therefore, color gamut compression is performed so as to prevent occurrence of hue distortion. For example, International Publication WO1999/055074 (corresponding to U.S. Pat. No. 6,560,356) describes color gamut compression to prevent occurrence of hue distortion.

In general, a method is employed wherein an equal hue plane of which the hue is equal is set, the chroma and lightness of a color to be compressed are moved two-dimensionally along the equal hue plane thereof, and accordingly, the compression direction thereof is changed. For example, as shown in FIG. 4A, an equal hue plane 21 is set to an portion where a color gamut 12 is narrower than a color gamut 11, and as shown in FIG. 4B, the chroma and lightness of a color to be compressed are moved two-dimensionally along the equal hue plane 21 thereof, and accordingly, the compression direction is changed. The hue is not changed even at any position on an equal hue plane, whereby occurrence of hue distortion can be prevented by compressing a color gamut with such a method.

Therefore, in the event that a color gamut to be drawn on an equal hue plane can be readily expressed as a color gamut expression (format), this format can be regarded as a format to be readily employed for general color gamut compression. Various formats for specifying a color gamut have been proposed.

SUMMARY OF THE INVENTION

However, as shown in the above-mentioned example in FIG. 1, in a case where image data is transmitted, the color gamut 11 of the sending terminal 1 is not necessarily suitable for the receiving terminal 2. For example, in a case where a color gamut that the sending terminal 1 can handle is wider than a color gamut that the receiving terminal 2 can handle, the color gamut of transmitted image data becomes wider than the color gamut of the receiving terminal 2. In this case, in order to express the image correctly at the receiving terminal 2, color gamut conversion processing such as color gamut compression or the like has to be performed regarding the color gamut of the image data to be transmitted.

However, with existing color gamut formats, complicated calculation processing has to be performed to express a color gamut to be drawn on an equal hue plane, and accordingly, there is a possibility that the load of color gamut conversion processing may increase.

There has been recognized demand to enable a color gamut, suitable for image data to be processed, of which the compatibility as to the algorithm of color gamut conversion processing is improved, to be provided.

According to an embodiment of the present invention, an information processing device includes: a color gamut information generating unit configured to generate color gamut information representing the color gamut of image data based on table information indicating the highest chroma point at each equal hue plane regarding a plurality of equal hue planes.

The table information may represent the highest chroma point at each equal hue plane by employing a lightness value and a chroma value.

The table information may represent the highest chroma point at each equal hue plane by employing a lightness value and a color difference.

The table information may include the hue of the equal hue plane indicating the highest chroma point as an index.

The information processing device may further include a color gamut conversion unit configured to convert the color gamut of the image data by employing the color gamut information generated by the color gamut information generating unit.

The information processing device may further include a transmission color gamut information generating unit configured to generate transmission color gamut information that is the color gamut information of a transmission format by employing the color gamut information generated by the color gamut information generating unit.

The transmission color gamut information may include color gamut specification information including the basic information of the color gamut, and color gamut body information including the detailed information of the color gamut.

The color gamut specification information may include index information specifying a known color gamut or a color gamut other than the known color gamut.

The color gamut body information may include the color gamut information, and information specifying a specifying method of the range of the color gamut with the color gamut information.

The information processing device may further include a sending unit configured to send the image data, and the transmission color gamut information generated by the transmission color gamut information generating unit to another device.

According to an embodiment of the present invention, an information processing method includes the step of: generating color gamut information representing the color gamut of image data based on table information indicating the highest chroma point at each equal hue plane regarding a plurality of equal hue planes.

According to an embodiment of the present invention, with a program causing a computer to execute an information processing method, the information processing method includes the step of: generating color gamut information representing the color gamut of image data based on table information indicating the highest chroma point at each equal hue plane regarding a plurality of equal hue planes.

With the above configurations, color gamut information representing the color gamut of image data is generated based on table information indicating the highest chroma point at each equal hue plane regarding a plurality of equal hue planes.

According to the above configurations, information can be processed, and particularly, a color gamut more suitable for image data to be processed can be provided.

BRIEF DESCRIPTION OF THE DRAWINGS

FIG. 5 is a schematic view for describing an example of index specification;

FIG. 8 is a schematic view for describing an example of 3D-LUT specification;

FIG. 10 is a diagram for describing an example of the features of an existing color gamut format;

FIGS. 11A through 11D are schematic views for describing Cusp table specification that is a color gamut format to which an embodiment of the present invention has been applied;

FIG. 13 is a diagram for describing an example of the features of Cusp table specification;

FIG. 14 is a schematic view for describing an example of color gamut conversion by employing each color gamut format;

FIGS. 20A and 20B are schematic views for describing color gamut specification information;

FIG. 22 is a schematic view for describing a configuration example of a Cusp table;

FIG. 23 is a schematic view illustrating a format example of color gamut information at the time of storing the Cusp table;

FIG. 24 is a schematic view for describing an assignment example of Color Space bits;

FIG. 25 is a schematic view for describing an assignment example of C-flag bits;

FIG. 26 is a schematic view for describing the calculation method of CompNum;

FIG. 31 is a block diagram illustrating a configuration example of a personal computer to which an embodiment of the present invention has been applied.

DESCRIPTION OF THE PREFERRED EMBODIMENTS

First, description will be made regarding an example of a common color gamut, and a method for specifying the range of the color gamut thereof (color gamut format). FIG. 5 is a diagram showing an example of index specification.

Figure 1:
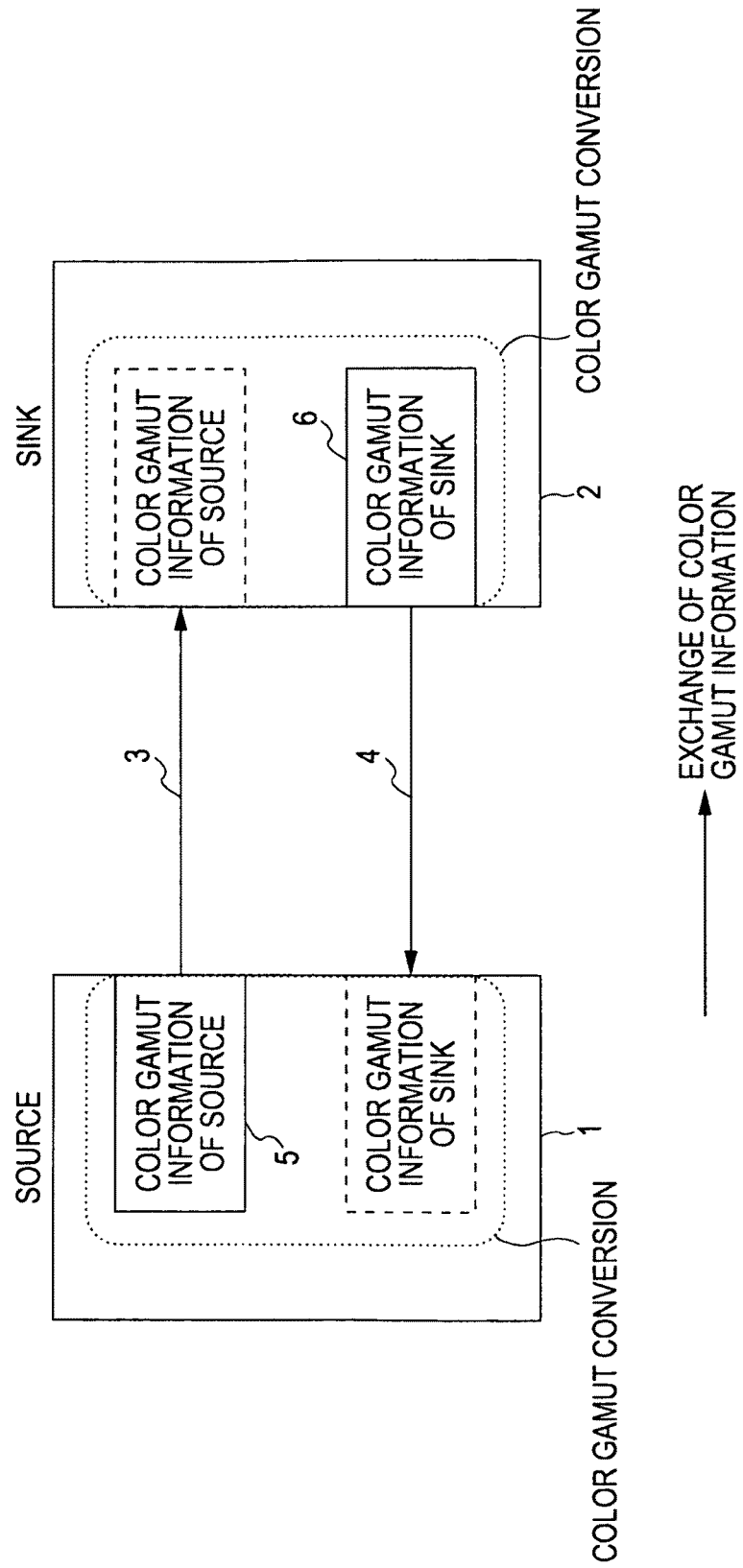
FIG. 1 is a block diagram for describing an example of an existing transmission system.
Figure 2:
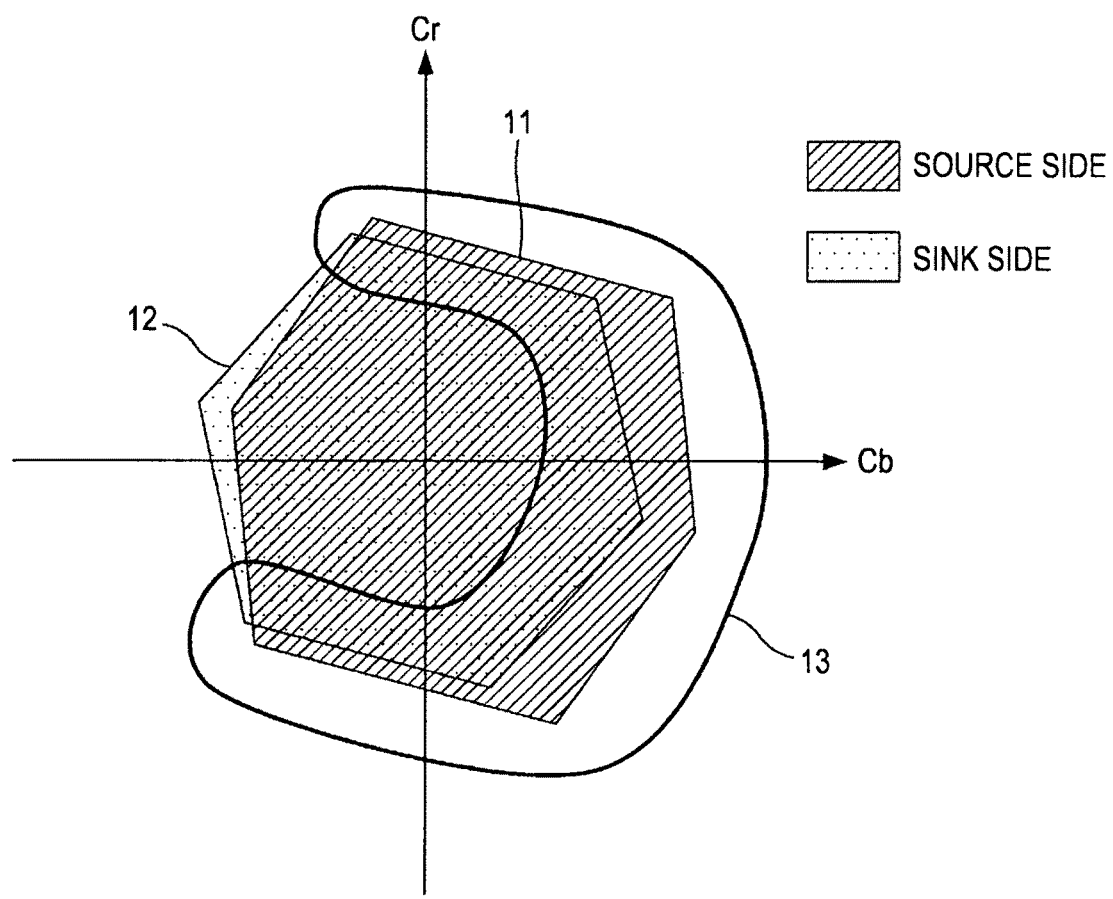
FIG. 2 is a schematic view for describing an example of color gamut compression.
Figure 3A:
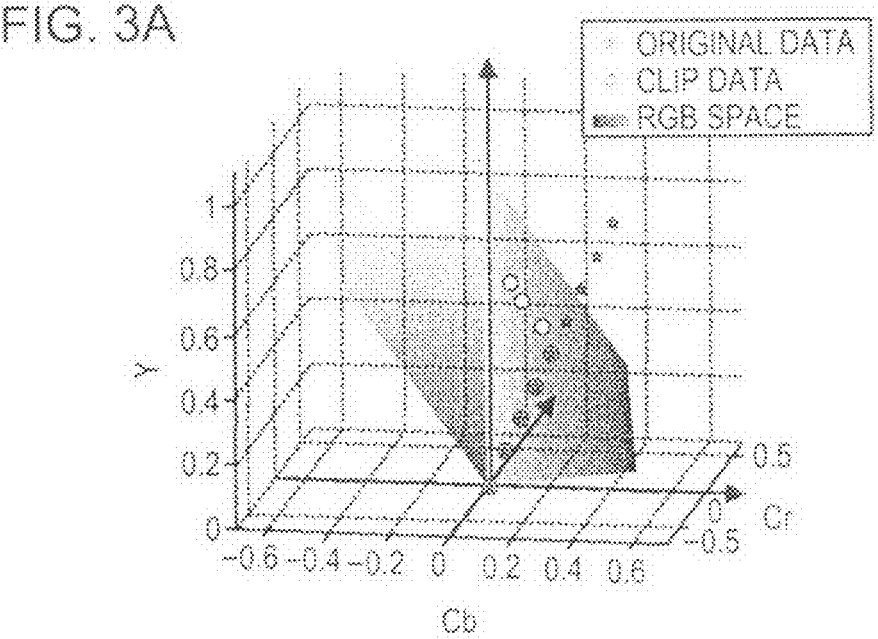
FIGS. 3A and 3B are schematic views for describing and example of hue distortion.
Figure 3B:
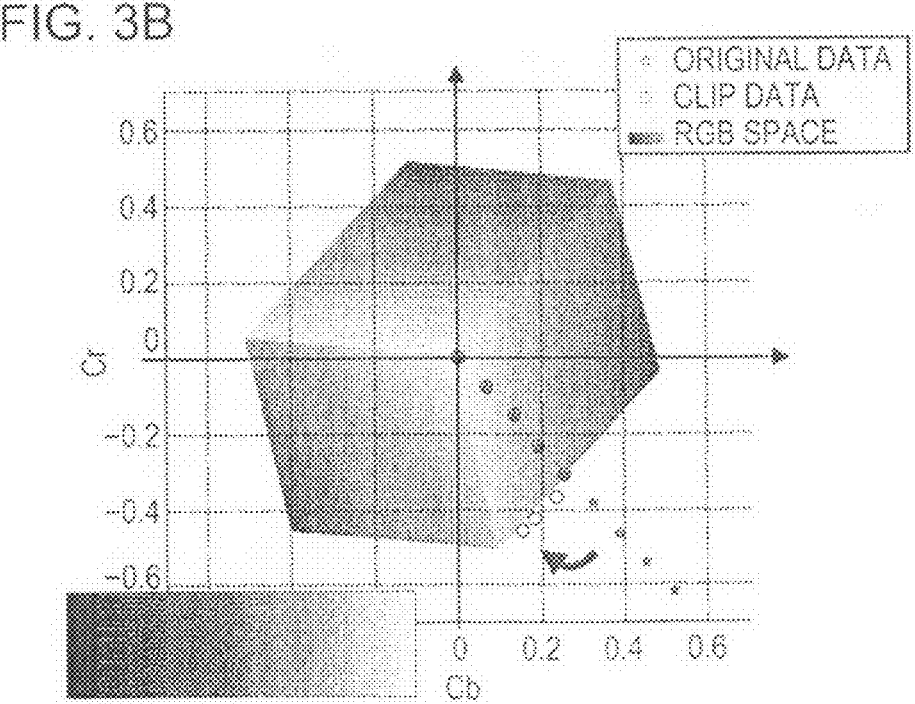
Figure 4A:
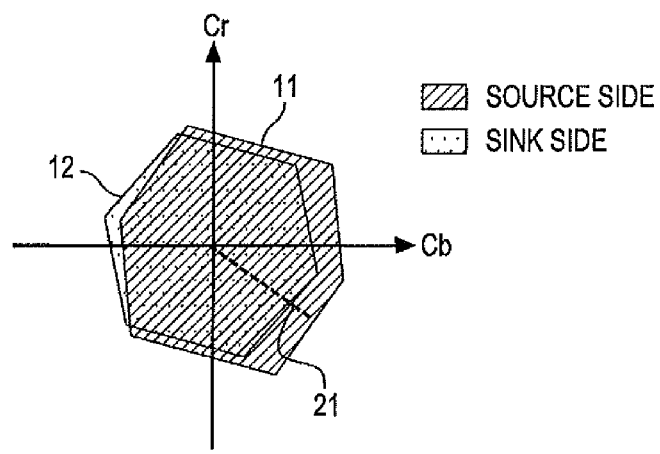
FIGS. 4A and 4B are schematic views for describing an example of color gamut compression along an equal hue plane.
Figure 4B:
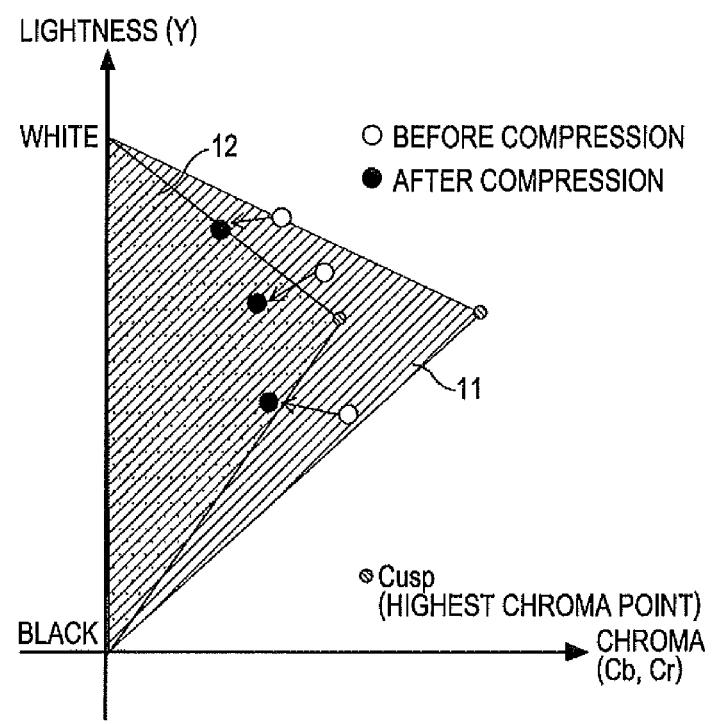

Index specification is a color gamut format for specifying a color gamut based on identification information. Several general-purpose (known) color gamuts to be frequently employed are prepared beforehand, and for example, such as Table 101 shown in FIG. 5, an index (identification information) is assigned to each color gamut. Subsequently, in a case where color gamut information is exchanged between devices for sending/receiving image data, only the index thereof (numeric value data in the case of the example in FIG. 5) is transmitted. The device which has received an index can determine the color gamut corresponding to the index based on Table 101 shown in FIG. 1. Specifically, simply determining the type of a color gamut by employing the index determines the range of the color gamut, whereby the device can determine the range of the color gamut with just one numeric value.

In the case of Table 101 in FIG. 5, a numeric value "0" is assigned to an input device as an index, and a numeric value "1" is assigned to sRGB (standard RGB) as an index. Also, a numeric value "2" is assigned to AdobeRGB (registered trademark) as an index, a numeric value "3" is assigned to WideRGB as an index, and a numeric value "4" is assigned to DCI-P3 as an index.

For example, in the case of specifying WideRGB color gamut information, the device should transmit the numeric value "3" alone. That is to say, the color gamut specified with the index is a color gamut of which the standard has been determined basically, and the range of the color gamut is determined with the color gamut name thereof. For example, sRGB to which the numeric value "1" has been assigned is the International Standard for color space that has been laid forth in October 1998 by the IEC (International Electrotechnical Commission). This sRGB is color space determined to ensure color reproduction between different environments such as difference between the types of personal computer, difference between devices such as displays, printers, and so forth. This sRGB has been laid forth with the color gamut of a CRT display as the base. For example, in the event that all of a digital camera, personal computer, display, and printer can handle sRGB, when displaying on a display or printing an imaged image, color appearances can be matched without being subjected to any processing. With sRGB, the expressible color range is narrower as compared to other color space, and inexpressible colors include emerald green, dense cyan, orange, light red, yellow, and so forth. Thus, sRGB is unsuitable for professional use wherein photos and graphic designs are handled professionally.

However, a color gamut of which the range is vague can also be index-specified. For example, the input device to which the numeric value "0" has been assigned indicates the color gamut of the input device of a digital camera, video camera, or the like which, can generate a moving image or still image. The color gamut of such an input device is very wide, and accordingly, it is difficult to specify a specific region, but as shown in FIG. 5, according to index specification, such as a very wide color gamut similar to the way that human eyes see, can be specified as a color gamut having an ambiguous range. The device which has received this numeric value "0" as an index can perform color gamut compression suitably by focusing more energy on only the own color gamut assuming that the input color gamut is very wide.

It goes without saying that this index does not have to be a numeric value, and for example may be a character such as an alphabet letter, or a symbol. Also, the number of color gamuts to which an index is assigned is optional.

Figures 6, 7:
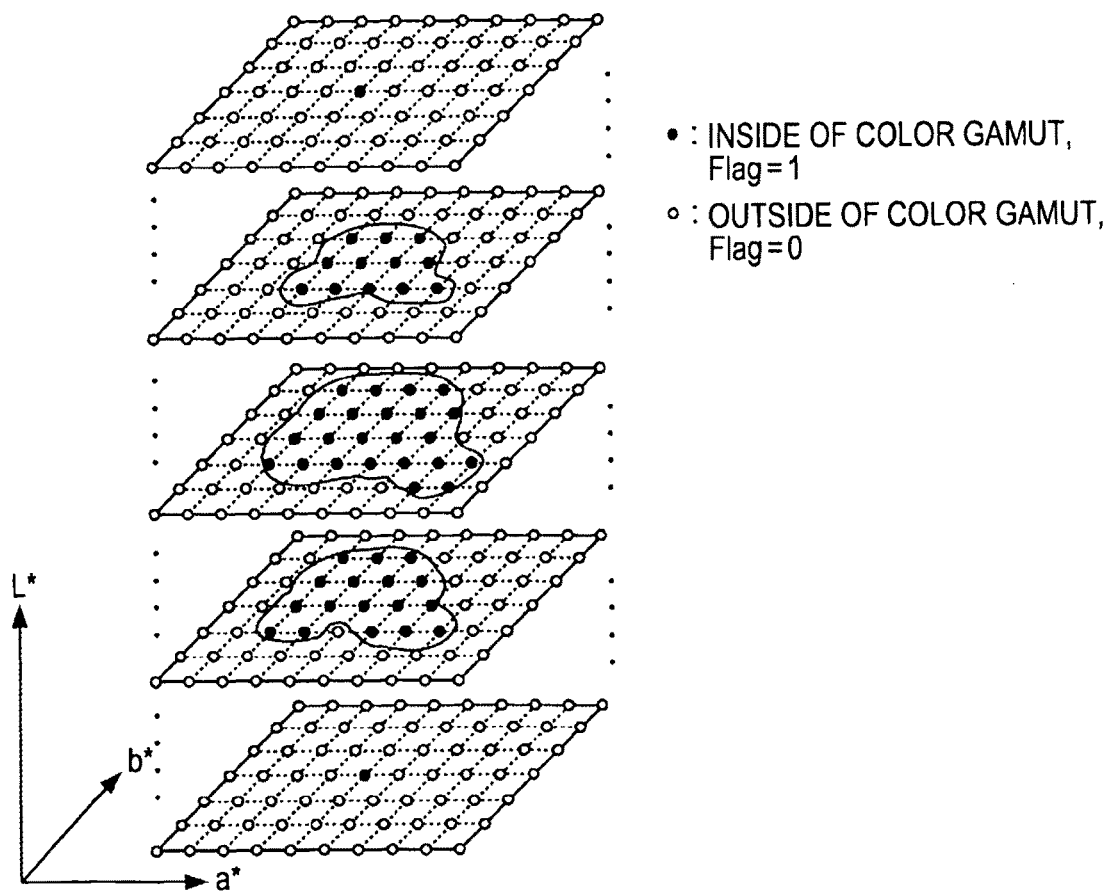
FIG. 6 is a schematic view for describing an example of chromaticity specification.
FIG. 7 is a schematic view illustrating an example of a color gamut shape with CIELAB space.

FIG. 6 is a diagram for describing an example of chromaticity specification. Chromaticity specification is a color gamut format representing the range of a color gamut by employing chromaticity data. For example, in the case of a device wherein additive color mixing property such as a display device holds, a color gamut can be defined with chromaticity data made up of the three primary colors (red (R), green (G), blue (B)) and a white point. In other words, a display device can calculate a transformation matrix for transforming an expressible color into the numeric value of color space not depending on any device (XYZ, CIELAB, or the like) by employing chromaticity data made up of the three primary colors and a white point.

For example, in the case of a display capable of expressing the sRGB color gamut, chromaticity information is shown such as Table 111 in FIG. 6. In the case of a display device of three or more colors, chromaticity information is made up of all of the primary colors and white serving as the base thereof. Various types of chromaticity information can be conceived as chromaticity, such as x, y chromaticity, u, v chromaticity, u', v' chromaticity, and so forth. This color gamut format is employed for ICC (International Color Consortium) profile.

The ICC profile is a file in which the properties of an image device, defined by an organization called ICC, are described. Usually, when outputting one image file, there have to be provided two profiles of an ICC profile for input device, and an ICC profile for output device. The ICC profile for input device is frequently embedded in an image file. When outputting the image thereof to another device through a PC (Personal Computer), an application supporting the ICC profile on the PC performs color gamut matching suitably by employing the ICC profile for output device to output the image. This method is premised on image processing conversion being performed by employing a PC, or the output device side supporting the ICC profile.

Next, 3D-LUT specification will be described. In the case of a device wherein additive color mixing property does not hold simply such as a printing device, the color gamut shape thereof becomes complicated. FIG. 7 is a diagram for describing an example of a color gamut defined within CIELAB, which represents the color gamut of a certain printing device with CIELAB space.

In such a case, as shown in FIG. 8, a color gamut can be expressed by employing a table or the like wherein a positive/negative flag is specified as to a lattice point where the color of the printing device is defined within color space (e.g., CIELAB or the like) expressing a color gamut. With the example in FIG. 8, such a table takes the form of a 3D look-up table (3D-LUT). 3D-LUT specification is a color gamut format for specifying the range of a color gamut by employing such as 3D-LUT. Such a method is employed as gamutTag of the ICC profile. Note that, with the look-up table shown in FIG. 8, Gamut flag is one-bit flag information. The color that the terms of which the value of this flag is "1" indicate exists within a color gamut, and the color that the terms of which the value of this flag is "0" indicate exists outside the color gamut.

Next, polygon specification will be described. Polygon specification is a color gamut format expressing the shape of a solid by employing a polygon, and is frequently employed for 3D computer graphics or the like. That is to say, the polygon specification is a method for expressing a color gamut within 3D space as a solid, and expressing the shape of the solid thereof, i.e., the range of the color gamut by employing a polygon.

Figures 9A, 9B:
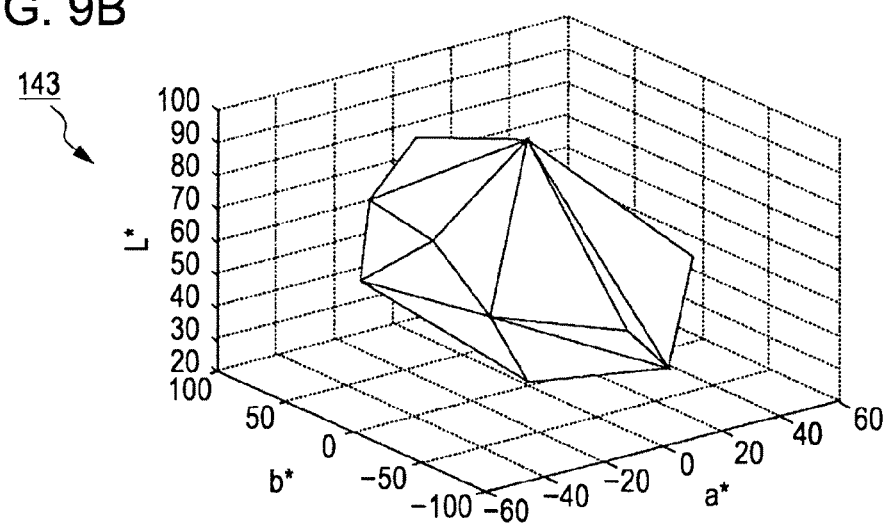
FIGS. 9A and 9B are schematic views for describing an example of polygon specification.

Therefore, with this polygon specification, as shown in FIG. 9A, a color gamut is specified with Table 141 representing the coordinates of the vertices of each polygon with color space not depending on devices such as CIELAB or the like, and Table 142 of the vertex number of each polygon (triangle in the case of the example in FIGS. 9A and 9B). A graph 143 shown in FIG. 9B visualizes Tables 141 and 142 in FIG. 9A. Similar to the case of the 3D-LUT specification, the polygon specification can be employed for the case of a complicated color gamut shape.

The features of the above-mentioned color gamut specifying methods are summarized as Table 151 in FIG. 10 regarding "capacity", "expressible shape", and "compatibility with color gamut compression algorithm".

As shown in Table 151 in FIG. 10, with regard to "capacity", the index specification is the most advantageous in that a color gamut can be expressed with an index alone (information capacity can be reduced most). Therefore, the communication load for color gamut specification can be reduced most. In the case of the chromaticity specification, information for specifying a color gamut is configured of only the chromaticity information of the basic primary colors, and accordingly, the capacity thereof is small although inferior to the index specification. Accordingly, the communication load is also small. The 3D-LUT specification and polygon specification are disadvantageous in that, even in the case of expressing the color gamut of a RGB display device that can be expressed with the chromaticity specification, those specifications have to have capacity 10 times or more the capacity in the case of the chromaticity specification (information capacity is great). Accordingly, the communication load is also great.

Note that, in the case of the 3D-LUT specification and polygon specification, the capacity depends on the complexity of the shape of the range of a color gamut to be expressed. In other words, the more complicated the shape of the range of a color gamut to be expressed becomes, the greater (the more disadvantageous) the capacity thereof becomes.

As shown in Table 151 in FIG. 10, with regard to "expressible shape", the polygon specification is the most advantageous (can express a wider variety of shapes). In the case of the polygon specification, a shape can be expressed with a plane directly, whereby the shape can be expressed more smoothly and more precisely (more accurately) than the 3D-LUT specification by a plane (polygon) being divided into pieces. In the case of the 3D-LUT specification, in addition to a device having common known color space, and a device wherein additive color mixing property holds like a display device, the color gamut of a complicated shape can be expressed, such as a printing device of subtractive color mixing base, or the like. In the case of the chromaticity specification, the color gamut of a device wherein additive color mixing property holds like a display device can be expressed. In reality, the chromaticity specification is restricted to the color space of a general RGB system. In the case of the index specification, the color gamut of a device of common known color space can be expressed. In reality, the index specification is restricted to the color space of a general RGB system.

As shown in Table 151 in FIG. 10, with regard to "compatibility with color gamut compression algorithm", none of the methods is advantageous. In the cases of the index specification and chromaticity specification, a complicated calculation has to be performed to calculate the highest chroma point (Cusp) at the time of an equal hue plane shape calculation. In the case of the 3D-LUT specification, in order to calculate equal hue plane information from the 3D table, a very complicated calculation has to be performed such that equal hue information is obtained from the hue information of each lattice point by interpolation. In the case of the polygon specification, in order to calculate the information of the sides of an equal hue region from a polygon solid, a complicated calculation has to be performed such as a conversion calculation from plane information to side information, interpolation of equal hue plane information, or the like.

As described above, in the event that "compatibility with color gamut compression algorithm" is low, the calculation amount at the time of color gamut conversion or the like increases, and accordingly, there is a possibility that the load thereof may increase. Therefore, description will be made below regarding a color gamut format wherein the "compatibility with color gamut compression algorithm" has been improved as compared to an existing color gamut format, and the "capacity" and "expressible shape" have an equal level as to those of an existing color gamut format.

FIGS. 11A through 11D are diagrams for describing Cusp table specification that is a color gamut format to which an embodiment of the present invention has been applied. The Cusp specification is a color gamut format (color gamut specifying method) wherein the "compatibility with color gamut compression algorithm" can be improved as compared to an existing color gamut format by directly expressing an equal hue plane employed for the color gamut compression algorithm. Further, the Cusp table specification can also hold the same level as an existing format regarding the "capacity" and "expressible shape". That is to say, in the case of the Cusp specification, an equal hue plane employed for the color gamut compression algorithm is directly specified, thereby omitting a complicated calculation at the time of color gamut compression.

For example, as shown in FIG. 11A, when a color gamut 201 of a certain display device is expressed with certain YCC space 200, as shown in FIG. 11B, a cutaway plane 202 which has been cut at an equal hue plane becomes a YC 2D plane 210 with the vertical axis as lightness Y, and with the horizontal axis as chroma C. If the YC coordinates of the highest chroma point (Cusp) can be known, the color gamut shape on this plane can be approximated with a triangle 211 connecting a white point, a black point, and a Cusp point. If the YC coordinates of the Cusp point with several representative hue planes are held as a numeric value table by taking advantage of this property, the color gamut of a device can be defined approximately. Such a color gamut format will be referred to as the Cusp table specification.

The capacity of a Cusp table depends on the number of representative hues to be held, but particularly with a display device system, the considerably accurate approximation of a color gamut can be realized only with Cusp information of six points of red, green, blue, cyan, magenta, and yellow. A Cusp table 221 shown in FIG. 11C is a table representing the representative six hues thereof by employing YCH (lightness, chroma, hue) coordinates, and a Cusp table 231 shown in FIG. 11D is a table representing the representative six hues thereof by employing YCbCr (lightness, color difference information) coordinates.

The Cusp information of a hue other than the representative hues (representative six hues in the case of the examples in FIGS. 11C and 11D) included in a Cusp table is calculated with linear interpolation or the like from the Cusp information on the neighborhood thereof. The lightness, color difference, hue, and chroma information employed here are not restricted to the YCC space, and accordingly, information in accordance with the lightness, color difference, hue, and chroma information with other lightness and color difference space (e.g., CIELAB, CIELUV, or the like) may be employed.

Figure 12:
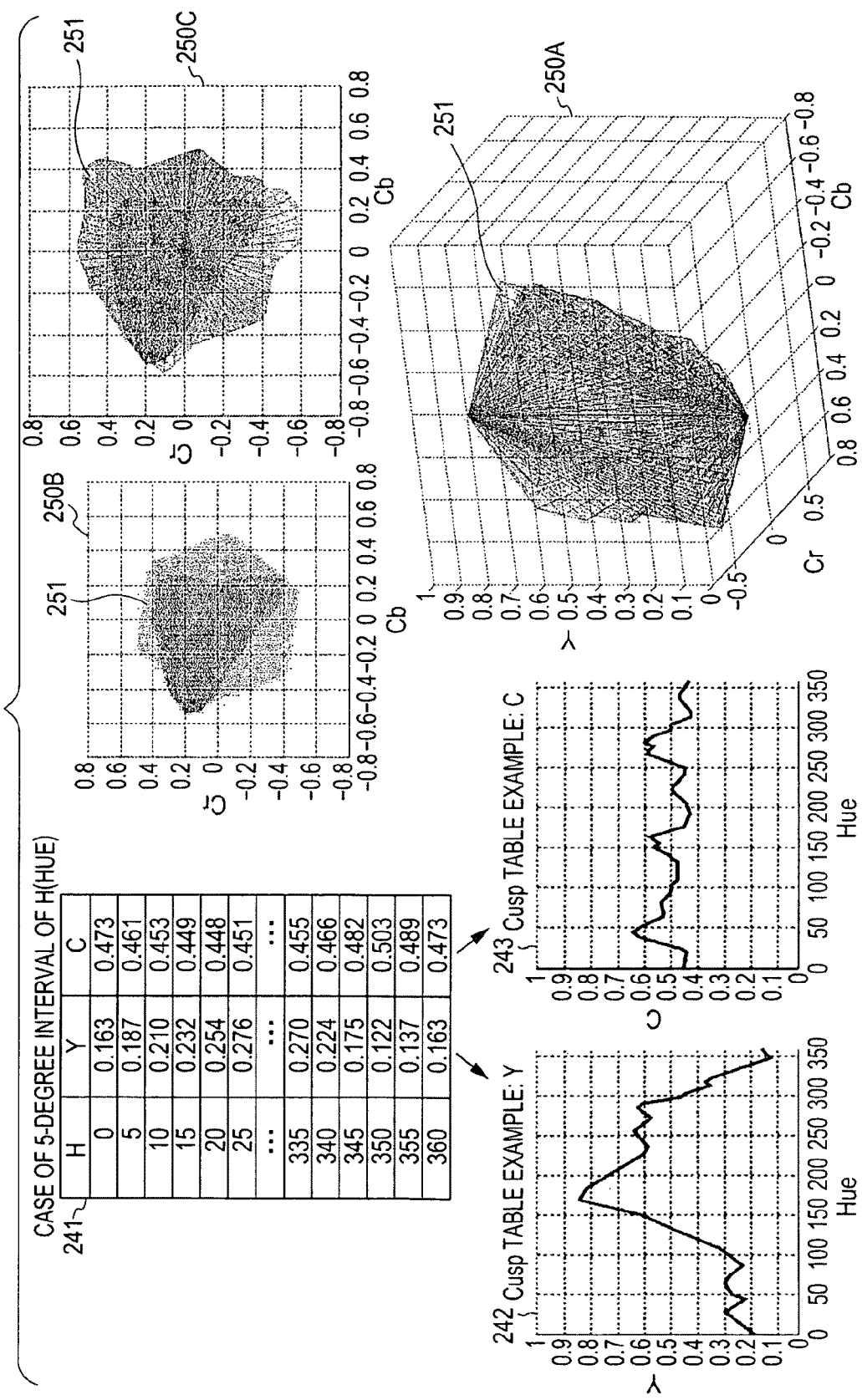
FIG. 12 is a schematic view for describing Cusp table specification that is a color gamut format to which an embodiment of the present invention has been applied.

It goes without saying that a hue other than the above-mentioned representative six hues may be employed as a hue (representative hue) making up a Cusp table. That is to say, an arbitrary hue may be employed as a representative hue (a Cusp table can be created by employing an arbitrary hue). For example, such as a Cusp table 241 shown in FIG. 12, hues with a predetermined interval (i.e., equal interval) may be employed as representative hues. The Cusp table 241 shown in FIG. 12 is a table wherein H (hue) with five degrees interval is taken as representative hues, and change in Y (lightness) and C (chroma) for each representative hue thereof is represented. A graph 242 graphs change in Y (lightness) as to H (hue) of the Cusp table 241 thereof. A graph 243 graphs change in C (chroma) as to H (hue) of the Cusp table 241.

If a color gamut shown in the Cusp table 241 is expressed with YCrCb space 250A, this color gamut becomes such a color gamut 251, for example. A graph 250B illustrates the shape of the color gamut 251 in the case of viewing the YCrCb space 250A along the Y axis toward from the lower side to the upper side in the drawing (in the Y axis forward direction). A graph 250C illustrates the shape of the color gamut 251 in the case of viewing the YCrCb space 250A along the Y axis toward from the upper side to the lower side in the drawing (Y axis opposite direction). As shown in these graphs, the Cusp table 241 may express a complicated-shaped color gamut. That is to say, the representative hues are not specialized in a specific color gamut by setting the representative hues with equal interval, whereby a complicated-shaped color gamut, such as multiple color gamuts being synthesized, for example, can also be expressed accurately.

For example, in a case where a device to output image data is set in a hypothetical manner, the color gamut of the hypothetical output device is set in a hypothetical manner. Such a hypothetical color gamut assumes various output devices, and accordingly, is frequently taken as a complicated-shaped color gamut such as multiple color gamuts being combined, as a matter of course. In a case where such a hypothetical color gamut is subjected to color gamut conversion, as described above, the Cusp table made up of the representative hues with equal interval is employed, whereby the hypothetical color gamut thereof can be readily expressed with high precision.

Features regarding the "capacity", "expressible shape", and "compatibility with color gamut compression algorithm" of the Cusp table specification such as described above will be shown in Table 261 in FIG. 13.

As shown in Table 261, in the case of the Cusp table specification, the size of the "capacity" depends on hue step precision (interval of representative hues). However, with the Cusp table specification, a color gamut can be expressed only by specifying the Cusp point of a representative hue, whereby a color gamut can be expressed with extremely small capacity as compared to the cases of the 3D-LUT specification and polygon specification. That is to say, the information amount in the case of the Cusp table specification is smaller than those in the cases of the 3D-LUT specification and polygon specification. Accordingly, communication load (load for color gamut information transmission) is also small. That is to say, the Cusp table specification is advantageous in that the "capacity" is small, and communication load is also small.

Also, as shown in Table 261, in the case of a Cusp table, not only known color space, and a RGB device color gamut of an additive color mixing system, but also a special color gamut such as a hypothetical output device color gamut, or synthetic color gamut of multiple color gamuts can be expressed. With the Cusp table specification, though it is difficult to completely express a complicated-shaped color gamut such as a subtractive color mixing device, a color gamut shape can be expressed with high precision regarding an additive color mixing system RGB device even as compared to the 3D-LUT specification. That is to say, the case of a Cusp table is various in the "expressible shape", and accordingly, is advantageous.

Further, as shown in Table 261, in the case of a Cusp table, Cusp information is expressed in a direct manner, and accordingly, a 2D color gamut expression of an equal hue plane can be readily performed, and the color gamut compression algorithm can be immediately employed without a complicated calculation. That is to say, the case of a Cusp table is very high in the "compatibility with color gamut compression algorithm", and accordingly, is very advantageous.

In reality, the color gamut of a display device is more varied than a printing device, and is frequently a non-standardized specific color gamut, i.e., a color gamut that fails to be subjected to index specification. Accordingly, the Cusp table specification, 3D-LUT specification, and polygon specification are frequently employed for expressing the color gamut of a display device. That is to say, it is desirable to readily express the color gamut of a display device with high precision.

In the case of the 3D-LUT specification, unless lattice interval is divided finely, an interpolation error for obtaining the information of an equal hue plane becomes great. On the other hand, the Cusp table specification can readily improve precision only by dividing the hue interval of the table finely to some extent. Accordingly, the capacity thereof can also be reduced as compared to the case of the 3D-LUT specification. Note that the precision in the case of the Cusp table specification is the same as that in the case of the polygon specification, but the capacity thereof is apparently small in the case of the Cusp table specification.

FIG. 14 illustrates an example of a situation of a calculation at the time of color gamut compression of each format. Like the example shown in FIG. 14, in the case of subjecting image data 301 to color gamut compression 302 to generate image data 303 subjected to color gamut compression, color gamut information indicating (specifying) a color gamut is referenced for the sake of the color gamut compression 302. In a case where the format of this color gamut information is a polygon specification 311, the device to perform the color gamut compression 302 has to generate a Cusp table by employing Open GL and so forth to expand a polygon, analyzing the border of an equal hue, and calculating a Cusp point at the border thereof.

Also, in a case where the format of the color gamut information is a 3D-LUT specification 312, the device to perform the color gamut compression 302 has to generate a Cusp table by employing Convex hull and so forth to expand a surface solid, analyzing the border of an equal hue, and calculating a Cusp point at the border thereof.

Further, in a case where the format of the color gamut information is a chromaticity specification 313, the device to perform the color gamut compression 302 has to obtain the XYZ values of the reference six hues (RGB and CMY) by converting RGB into XYZ. Also, the device to perform the color gamut compression 302 has to generate a Cusp table by converting XYZ into YCC to perform 6-facepiece expansion with the reference six hues, and YCC space of white and black, and interpolating the hue information from the Cusp information of the six hues.

Also, in a case where the format of the color gamut information is an index specification 314, the device to perform the color gamut compression 302 has to reference the index table to determine the color gamut specified with the index, thereby performing the same processing as that in the case of the chromaticity specification regarding the color gamut thereof.

On the other hand, in the case of a Cusp table specification 315, a Cusp table has been prepared beforehand, the device to perform the color gamut compression 302 can perform directly the color gamut compression 302 by taking advantage of the Cusp table thereof without performing other processing. That is to say, the Cusp table specification 315 is high in the compatibility as to the color gamut compression algorithm as compared to the cases of the other specifying methods. In other words, an information processing device to process image data can provide a color gamut suitable for the image data to be processed with the compatibility as to the algorithm of the color gamut conversion processing being improved by employing the Cusp table specification as the color gamut format of the image data.

Incidentally, in the case of transmitting image data between devices, in order to prevent occurrence of inconvenience such as hue distortion or the like due to the difference of the color gamuts that the devices can handle, color gamut conversion has to be performed frequently. In the case of performing color gamut conversion, not only image data but also the above-mentioned color gamut formats have to be transmitted.

However, each color gamut format has features such as described above, and accordingly, the color gamut format of one device is not necessarily the optimal in the other device. For example, it can be conceived that the color gamut is too narrow with sRGB specified by the index specification. Conversely, it can be conceived that processing load is too great as to the capability of the device with the polygon specification. Thus, with an existing color gamut format, there has been a possibility that the versatility is low, and available systems are restricted.

On the other hand, in the case of the above-mentioned Cusp table specification, a hue is directly expressed, and accordingly, the compatibility as to the color gamut compression algorithm is high as compared to the cases of the other specifying methods. Also, the color gamut specified by the Cusp table specification is not a predetermined color gamut like the color gamut specified by the index specification. Further, the flexibility of the range of a color gamut is high like the 3D-LUT specification and polygon specification. Further, the capacity can also be reduced as compared to those of the 3D-LUT specification and polygon specification. Accordingly, the Cusp table specification can be employed at various devices as compared to the typical other color gamut formats. That is to say, the Cusp table specification is high in versatility as compared to the other color gamut formats.

Therefore, with each device of a system for transmitting image data between devices, this Cusp table specification is employed as a color gamut format, whereby the versatility as a system can be further improved.

Note that, in order to further improve the versatility of the system, it is desirable that there is no restriction regarding the color gamut format of each device. That is to say, it is desirable that image data can be transmitted between devices which can handle an independent color gamut format mutually. With a system not ensuring that the color gamut formats between devices are unified, even if color gamut information is simply exchanged between the devices, color gamut information thereof is not necessarily recognized mutually. For example, even if a Cusp table is supplied to a device which can handle only the index specification, there is a possibility that a fact that this table is color gamut information fails to be recognized.

Thus, with a system wherein the flexibility of a color gamut format is improved, a transmission format of high-versatility color gamut information is demanded to perform exchange of color gamut information more correctly. For example, with a system wherein the number of available color gamut formats is not restricted to one, even if any kind of format of color gamut information is transmitted, a transmission format of high-versatility color gamut information is demanded so as to recognize at least that the received information is color gamut information to handle this correctly.

Description will be made below regarding the transmission format of the color gamut information thereof.

Figure 15:
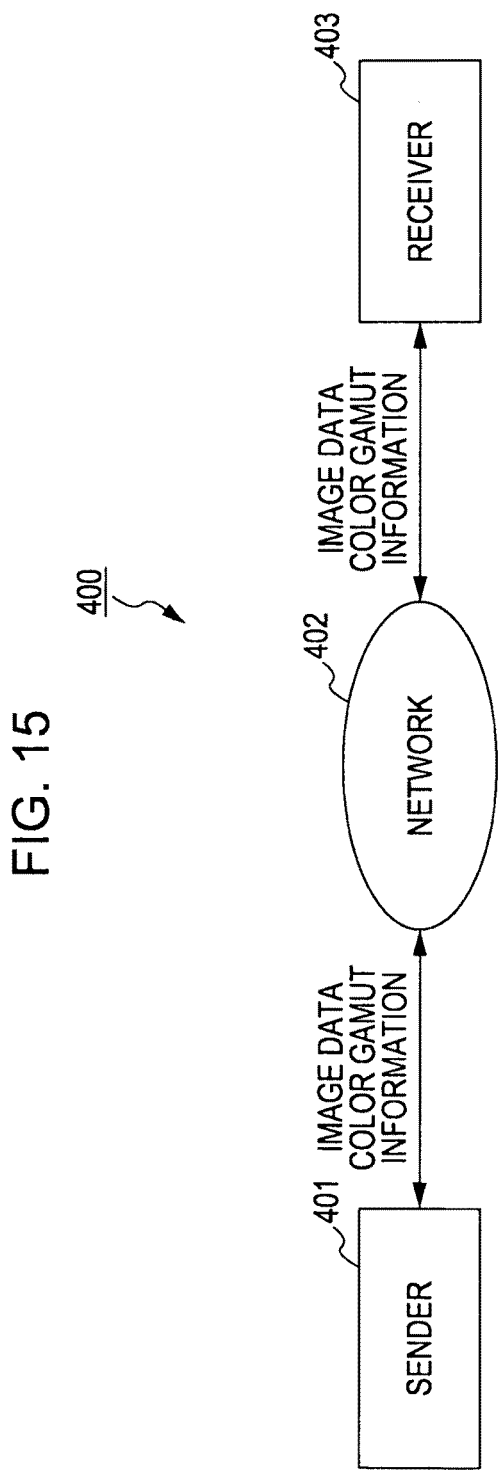
FIG. 15 is a block diagram illustrating a configuration example of a transmission system to which an embodiment of the present invention has been applied.

FIG. 15 is a block diagram illustrating a configuration example of a transmission system to which an embodiment of the present invention has been applied. The transmission system 400 shown in FIG. 15 is a system for transmitting image data from a sender 401 to a receiver 403 through a network 402.

The sender 401 may be any kind of device as long as the device has a function for transmitting image data, and accordingly, various types of device are assumed, for example, such as an input device such as a digital camera, video camera, or the like. The network 402 may be any kind of communication network as long as the network is a transmission medium for image data, and image data can be transmitted. Examples of communication networks conforming to various standards to serve as the network 402 include, for example, the Internet, Ethernet, dial-up line network, and so forth. Also, other examples of communication networks conforming to various standards to serve as the network 402 include USB (Universal Serial Bus), IEEE (Institute of Electrical and Electronic Engineers) 1394, HDMI (High-Definition Multimedia Interface), and so forth. Further, in addition, wireless networks such as a wireless LAN (Local Area Network), Bluetooth (registered trademark), or the like can be applied as this network 402. The receiver 403 may be any kind of device as long as the receiver has a function for receiving image data, and various devices are assumed, for example, such as a display device such as a CRT display, LCD, or the like, a printing device such as a printer or the like, and the like.

In a case where there is difference between a color gamut that the sender 401 (or the device on the prior stage of the sender 401) can express and a color gamut that the receiver 403 (or the device on the subsequent stage of the receiver 403) can express, there is a possibility that inconvenience such as hue distortion or the like may occur. Therefore, in the case of transmitting image data from the sender 401 to the receiver 403, in order to prevent occurrence of inconvenience such as hue distortion or the like, color gamut conversion is performed at least one of the sender 401 and receiver 403 as appropriate. For the sake of the color gamut conversion thereof, or determination of the necessity of the color gamut conversion thereof, exchange of color gamut information indicating a color gamut is performed between the sender 401 and receiver 403.

For example, in the case of color gamut conversion being performed at the sender 401, the sender 401 obtains color gamut information indicating a color gamut that the receiver 403 can express before transmission of image data, and employs the color gamut information thereof to perform color gamut conversion of image data as appropriate. Subsequently, the sender 401 sends the image data after color gamut conversion thereof to the receiver 403.

Also, for example, in the case of color gamut conversion being performed at the receiver 403, the sender 401 sends image data, and also color gamut information indicating a color gamut that the sender 401 can express, i.e., information indicating the color gamut of the image data to the receiver 403. The receiver 403 employs the color gamut information thereof to convert the color gamut of the image data into a color gamut that the receiver 403 can express as appropriate.

With the transmission of such color gamut information, the sender 401 and receiver 403 transmit the color gamut information with a later-described transmission format. The sender 401 and receiver 403 can improve the versatility of transmission of color gamut information, and transmit the color gamut information more correctly to a wider variety of devices, by employing this transmission format. In other words, the transmission system 400 (sender 401 and receiver 403) can provide a color gamut more suitable for image data to be processed.

Figure 16:
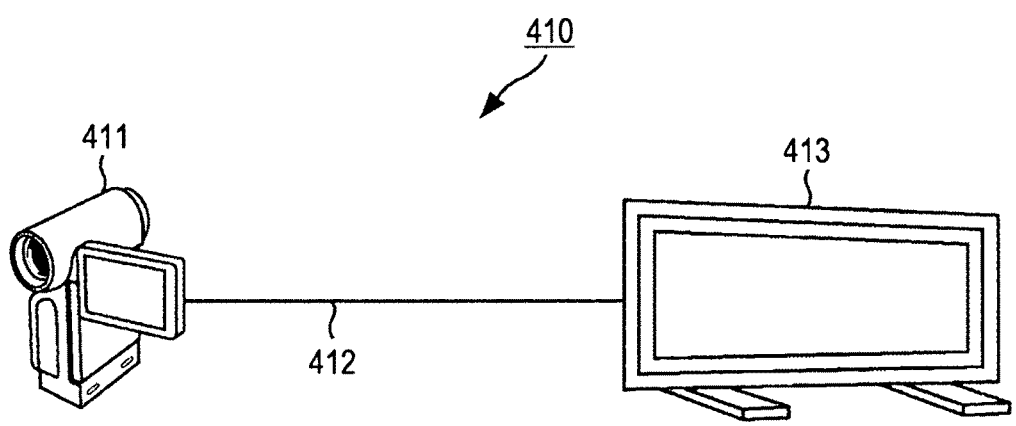
FIG. 16 is a schematic view illustrating a more specific example of the transmission system in FIG. 15.

The network system 410 shown in FIG. 16 is diagram illustrating a specific example of the transmission system 400 in FIG. 15. That is to say, the network system 410 in FIG. 16 corresponds to the transmission system 400 in FIG. 15. Also, the video camera 411 in FIG. 16 corresponds to the sender 401 in FIG. 15. The HDMI cable 412 in FIG. 16 corresponds to the network 402 in FIG. 15. The LCD 413 in FIG. 16 corresponds to the receiver 403 in FIG. 15.

The video camera 411 includes the function of the sender 401, and supplies imaged image data (still image or moving image) to the LCD 413 through the HDMI cable 412. Upon receiving the image data transmitted from the video camera 411 through the HDMI cable 412, the LCD 413 displays the image thereof.

With such a system, in general, a color gamut that the video camera 411 can express (the color gamut of image data generated at the video camera 411), and a color gamut that the LCD 413 can express, differ mutually. Therefore, with the network system 410, color gamut conversion is performed at one of the video camera 411 and LCD 413 as appropriate. Therefore, with the network system 410, not only image data but also color gamut information are exchanged between the video camera 411 and LCD 413.

At this time, the video camera 411 and LCD 413 transmit the color gamut information with a more versatile transmission format, and accordingly, restriction due to the format can be eliminated regarding the color gamut information of the video camera 411 and LCD 413. That is to say, the network system 410 can be realized without depending on the format of the color gamut information of the video camera 411 and LCD 413. In other words, the video camera 411 can transmit image data to a wider variety of display devices so as to express the image data more correctly without causing inconvenience such as hue distortion or the like.

Note that, with the transmission system 400 in FIG. 15 (the network system 410 in FIG. 16), it is optional whether color gamut conversion is performed on the sending side or receiving side. For example, this may be predetermined beforehand, may be determined based on predetermined conditions, or may be determined based on the instructions of a user or the like.

Figure 17:
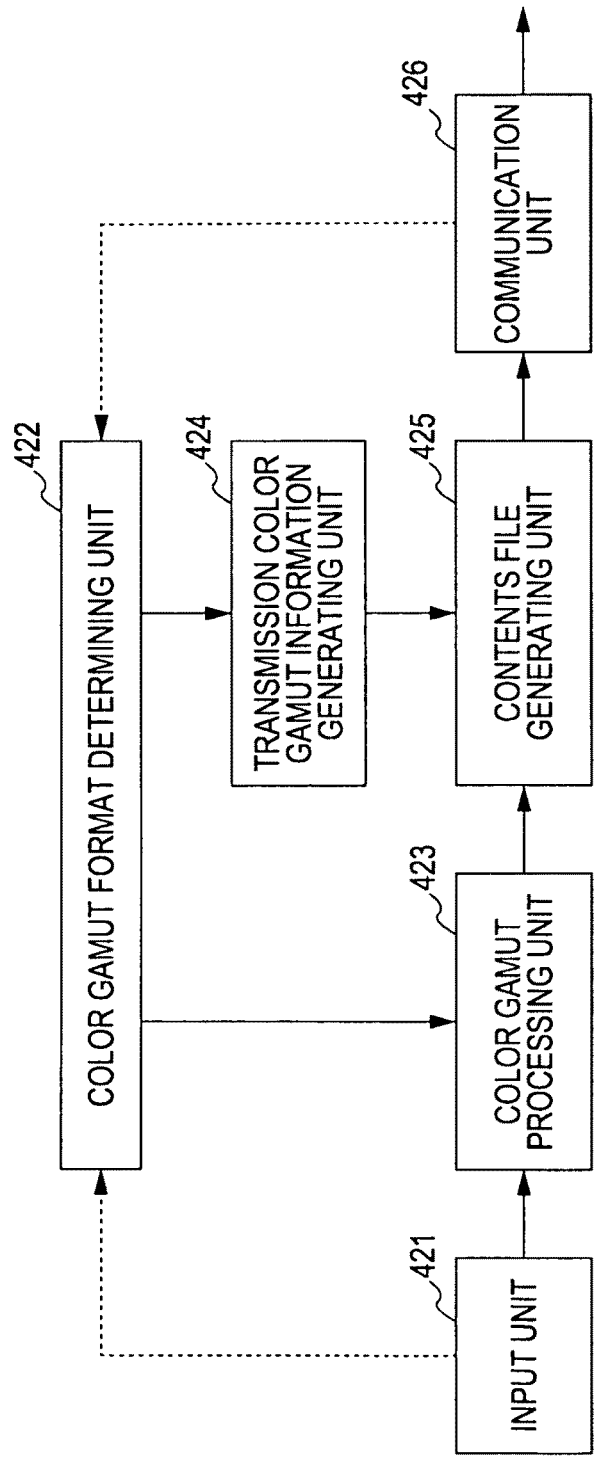
FIG. 17 is a block diagram illustrating a principal configuration example of the sender in FIG. 15.

FIG. 17 is a block diagram illustrating a principal configuration example of the sender 401 in FIG. 15. In FIG. 17, the sender 401 includes an input unit 421, color gamut format determining unit 422, color gamut processing unit 423, transmission color gamut information generating unit 424, contents file generating unit 425, and communication unit 426.

The input unit 421 is, for example, configured of an input device such as a camera or the like, external input terminal, and so forth, generates content data including image data, or obtains this from an external device. Also, the input unit 421 includes an input device such as various types of buttons, keyboard, touch panel, or the like, and an external input terminal, and so forth, and accepts instructions from a user or external device.

The color gamut format determining unit 422 determines a method for specifying the color gamut of image data to be transmitted, and the range of the color gamut thereof (i.e., color gamut format). At this time, the color gamut format determining unit 422 determines a color gamut format based on the instruction of a user or external device accepted at the input unit 421, or the color gamut information of the receiver 403 received through the communication unit 426. Note that the color gamut format determining unit 422 can specify existing color gamut information (color gamut format), and can also newly generate color gamut information. For example, the color gamut format determining unit 422 compares the color gamut of image data output from the input unit 421, and a color gamut that the receiver 403 (or output device on the subsequent stage thereof) can express. Also, the color gamut format determining unit 422 obtains a new color gamut (color gamut format) by subjecting a portion located on the outer side of a color gamut that the receiver 403 can express to color gamut compression, of the color gamut of image data, based on the comparison result, with a predetermined method, and determines this as the color gamut of the image data. That is to say, in this case, the color gamut format determining unit 422 newly generates color gamut information.

It goes without saying that the color gamut format determining unit 422 can newly generate color gamut information even in cases other than this case. For example, the color gamut format determining unit 422 can accept information specifying the color gamut supplied from the input unit 421 to generate the color gamut information representing the specified color gamut as the color gamut of image data. That is to say, the above-mentioned "determination" includes not only "selection" of existing color gamut information but also "new creation".

The color gamut processing unit 423 performs color gamut conversion of the color gamut of image data of the content data supplied from the input unit 421 into the color gamut format (the range of the color gamut) determined at the color gamut format determining unit 422, as appropriate. For example, the color gamut processing unit 423 performs color gamut compression of the portion on the outside of the color gamut supplied from the color gamut format determining unit 422, of the color gamut of image data, by a predetermined method.

Note that the color gamut format determining unit 422 can also determine the color gamut of image data by employing a color gamut other than a color gamut that the receiver 403 can express, for example, based on the user's instructions or the like. For example, the color gamut format determining unit 422 can determine the color gamut of image data by employing the color gamut set as the color gamut of an output device hypothetically without specifically determining (the color gamut of) an output device for outputting the image of image data. For example, in the event that wide image data such that the range of a color gamut can be regarded as infinite, like image data generated at a video camera, is supplied to an output device without change, there is a possibility that not only the output device may fail to handle this, but also failure of the output device may occur. Therefore, the sender 401 hypothetically sets a color gamut of which the range is finite without specifically determining the receiver 403 (output device), and compresses the color gamut of image data to the hypothetical color gamut thereof. Thus, the safeness of the image data can be improved (the failure rate at the receiver 403 can be reduced). At this time, the receiver 403 sets the range of a hypothetical color gamut wider than the color gamut of an actual output device, whereby useless color gamut compression and useless image quality deterioration can be suppressed.

The transmission color gamut information generating unit 424 converts the color gamut information indicating the color gamut format determined by the color gamut format determining unit 422 into a versatile transmission format to generate transmission color gamut information. The contents file generating unit 425 creates a content file from the content data supplied from the color gamut processing unit 423, and stores the transmission color gamut information supplied from the transmission color gamut information generating unit 424 in the content file thereof.

Note that transmission color gamut information may be created within the content file directly. In this case, the transmission color gamut information generating unit 424 and contents file generating unit 425 are formed in an integral manner. For example, the integrated transmission color gamut information generating unit 424 and contents file generating unit 425 will be referred to as a contents file generating unit. The contents file generating unit thereof creates a file from the content data supplied from the color gamut processing unit 423. Also, the contents file generating unit thereof writes the color gamut information (or information specifying color gamut information) determined by the color gamut format determining unit 422 in the file thereof with a versatile transmission format.

The communication unit 426 performs communication with the receiver 403 through the network 402 to exchange information. For example, the communication unit 426 packetizes the content file supplied from the contents file generating unit 425 to transmit this to the receiver 403. Also, for example, the communication unit 426 receives the transmission color gamut information (packetized in reality) supplied from the receiver 403, and extracts the color gamut information of the receiver 403 from the received transmission color gamut information to supply this to the color gamut format determining unit 422.

Figure 18:
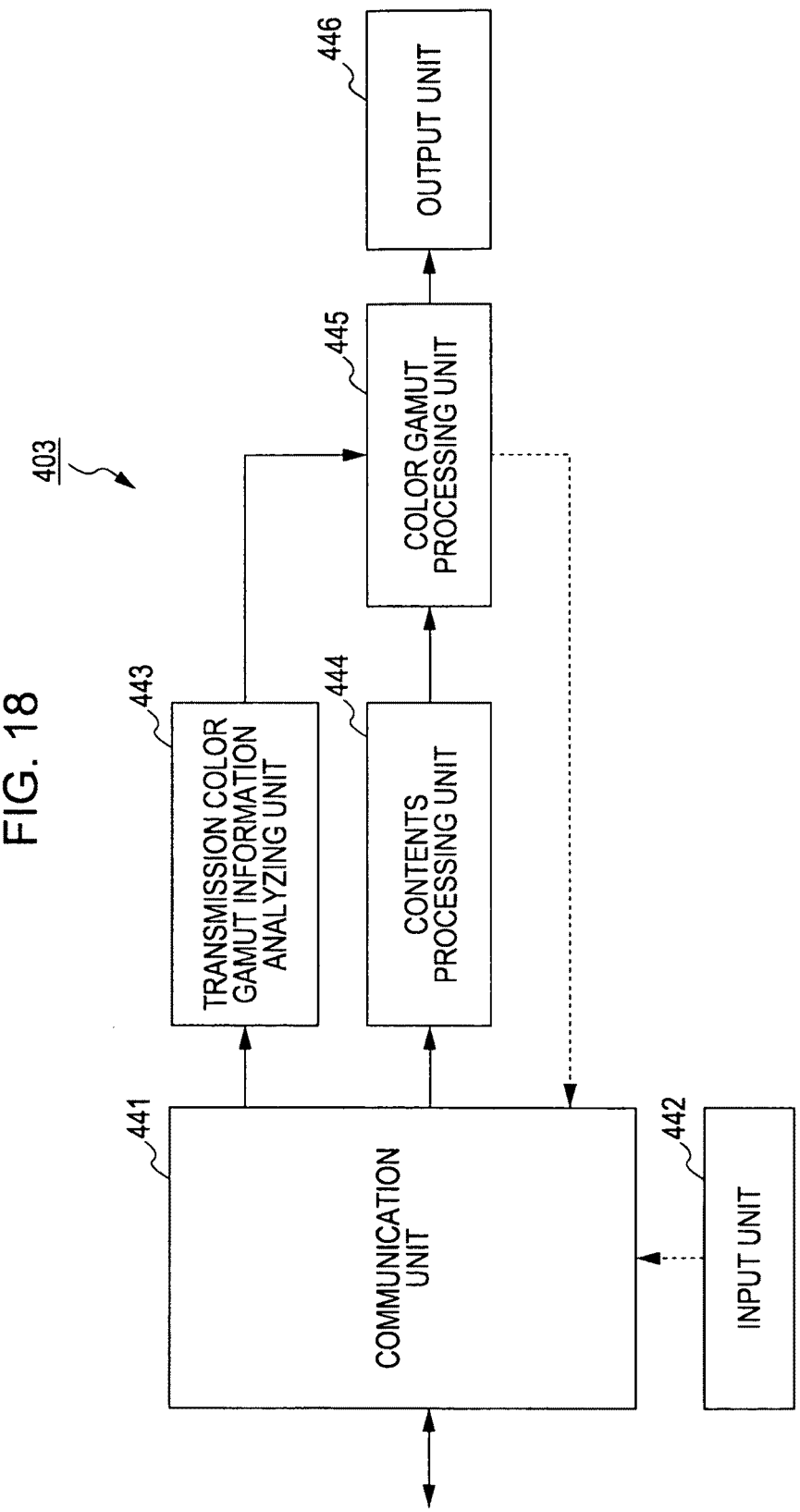
FIG. 18 is a block diagram illustrating a principal configuration example of the receiver in FIG. 15.

FIG. 18 is a block diagram illustrating a principal configuration example of the receiver 403 in FIG. 15. In FIG. 18, the receiver 403 includes a communication unit 441, input unit 442, transmission color gamut information analyzing unit 443, contents processing unit 444, color gamut processing unit 445, and output unit 446.

The communication unit 441 performs communication with the sender 401 through the network 402 to exchange information. For example, the communication unit 441 converts color gamut information that the receiver 403 can express, input (specified) from a user or external device through the input unit 442, or supplied from the color gamut processing unit 445, into a versatile transmission format.

Also, the communication unit 441 packetizes the transmission color gamut information thereof to send this to the sender 401. Also, for example, the communication unit 441 receives the content file (packetized in reality) supplied from the sender 401, and extracts content data from the content file thereof to supply this to the contents processing unit 444. Further, the communication unit 441 extracts transmission color gamut information from the content file supplied from the sender 401, and supplies this to the transmission color gamut information analyzing unit 443.

The transmission color gamut information analyzing unit 443 analyzes the transmission color gamut information supplied from the communication unit 441, and determines the color gamut of the image data supplied from the sender 401. The contents processing unit 444 processes the content data supplied from the communication unit 441, and supplies image data to the color gamut processing unit 445. The color gamut processing unit 445 converts the color gamut of the image data supplied from the contents processing unit 444 as appropriate based on the color gamut information supplied from the transmission color gamut information analyzing unit 443, and a color gamut that the receiver 403 (or output device on the subsequent stage) can express.

The output unit 446 includes, for example, a display for displaying an image, and speakers for outputting audio, and outputs the content data supplied from the color gamut processing unit 445 thereto. Also, an arrangement may be made wherein the output unit 446 includes an external output terminal, and outputs the content data supplied from the color gamut processing unit 445 to an external device.

Figure 19A:
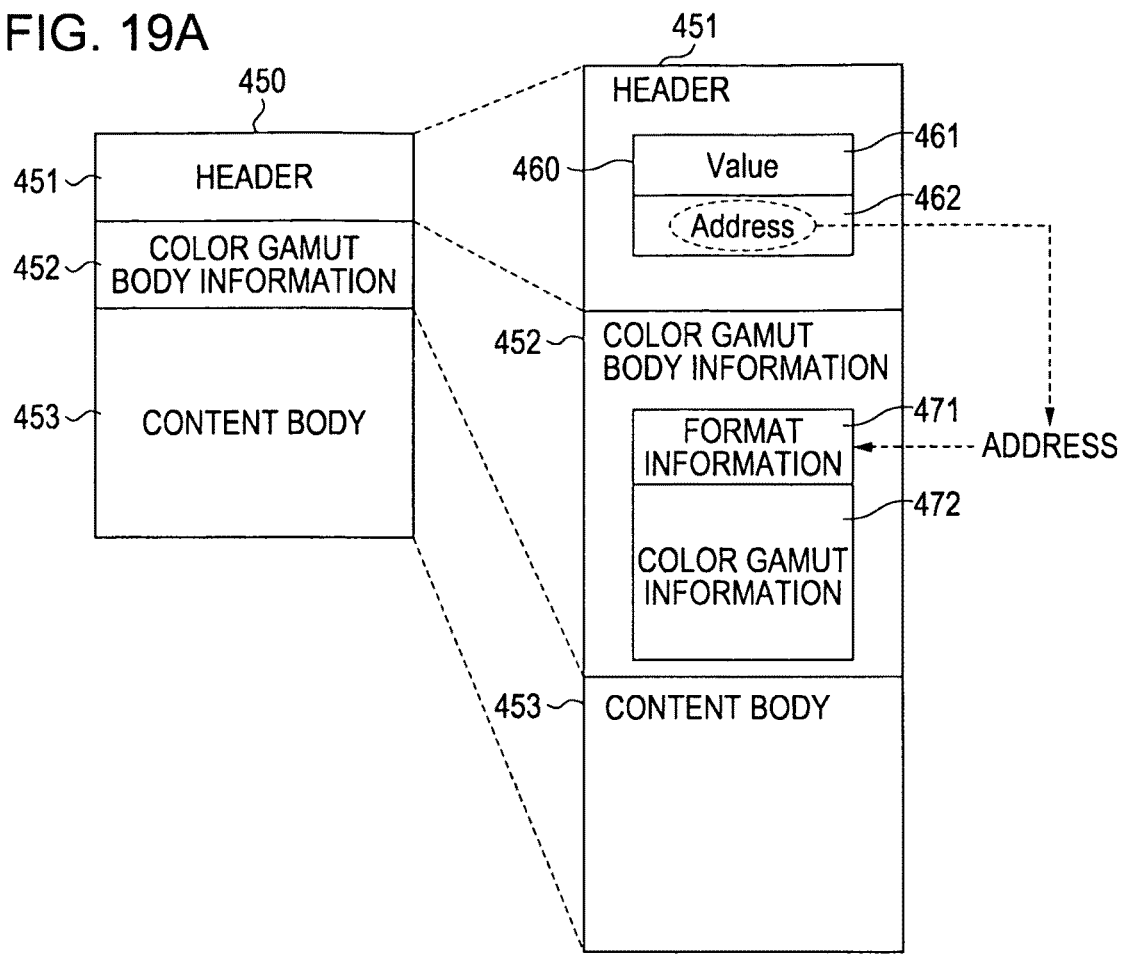
FIGS. 19A and 19B are schematic views for describing a format example of transmission color gamut information.
Figure 19B:
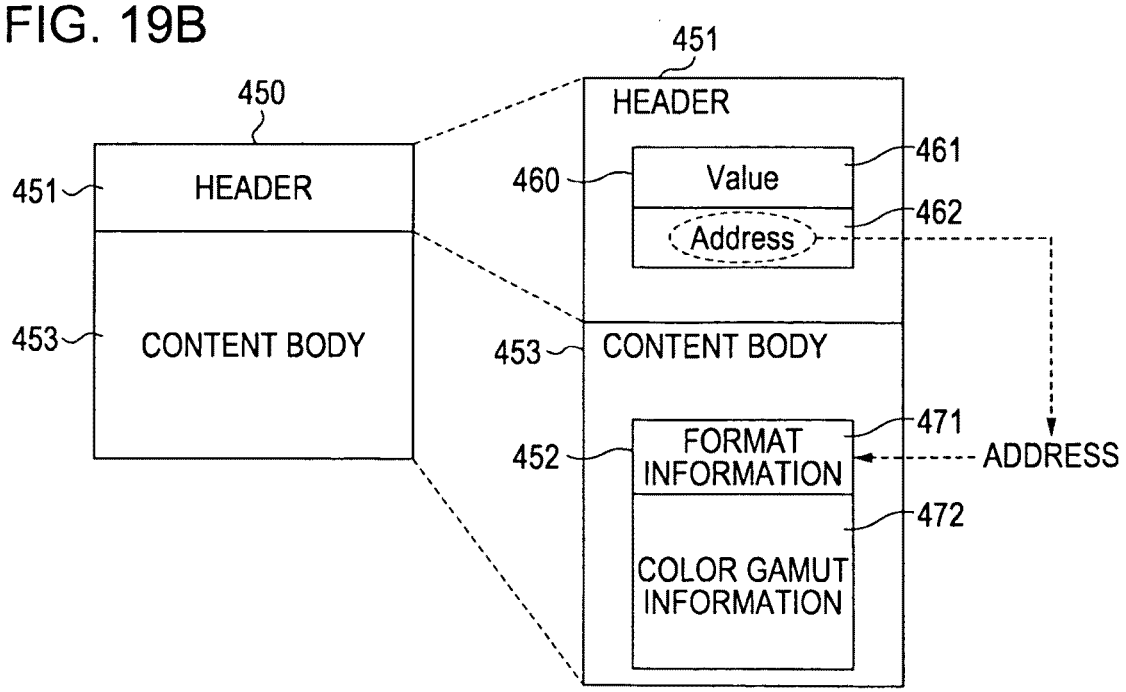

Next, the above-mentioned the transmission format of color gamut information (transmission color gamut information) for improving versatility will be described. FIGS. 19A and 19B are schematic views illustrating a configuration example of a content file to which an embodiment of the present invention has been applied. The contents file generating unit 425 of the sender 401 generates, for example, a file having a configuration such as shown in FIG. 19A to transmit content data and color gamut information. In FIG. 19A, a video content 450 is configured of a header 451, color gamut body information 452, and content body 453. The video content 450 is a file created from content data such as image, audio, and the like, and the header 451 includes the header information of various types of data. The color gamut body information 452 includes the detailed information of color gamut information itself. The content body 453 includes content data.

The video content 450 stores the color gamut information and transmission format of content data. The color gamut information is configured of color gamut specification information serving as a header, and color gamut body information serving as a payload in the transmission format. As described above, the color gamut body information 452 is added to the header 451, and content body 453. On the other hand, the color gamut specification information 460 including color gamut basic information is stored in the header 451.

The color gamut specification information 460 is configured of Value 461 indicating the features of a color gamut, and Address 462 indicating the storage location of the color gamut body information 452. The color gamut body information 452 is configured of format information 471 including the detailed information relating to the format of a color gamut, and color gamut information 472 specifically indicating the range of a color gamut.

Note that the position of the color gamut body information 452 is optional, and accordingly may be added to the back of the content body 453. Also, for example, as shown in FIG.

19B, the color gamut body information 452 may be stored in the content body 453. Note that the configuration example shown in FIG. 19A, and the configuration example shown in FIG. 19B are basically the same except that the positions of the color gamut body information 452 differ. Accordingly, description regarding FIG. 19A can be applied to FIG. 19B basically. Description will be made below regarding the configuration example shown in FIG. 19A as long as the examples in FIGS. 19A and 19B do not have to be described separately.

However, like FIG. 19B, in the case of the color gamut body information 452 being stored in the content body 453, the color gamut information is also read in each time image data (particularly, a moving image or the like) is read out from a medium, and is loaded. However, in a common case, the color gamut information is sufficient to be read once at the time of the first start-up. As shown in FIG. 19A, the device can read out only the content body 453 at the time of loading image data by separating the content body 453 from the color gamut body information 452. Thus, such useless processing duplication can be avoided, and load can also be reduced.

FIGS. 20A and 20B are diagrams for describing the internal configuration of the color gamut specification information 460. As shown in FIG. 20A, the Value 461 and Address 462 are each configured of 64-bit information, for example. As shown in Table 481, in the case of the color gamut format of the image data to be transmitted is the index specification, the numeric value of the index assigned to a known color gamut to be employed is set to the Value 461. With the example in FIG. 20A, in the case of a numeric value "0" being set to the Value 461, this indicates that the image data of the video content 450 is image data generated at the input device (i.e., the color gamut of the image data is very wide). Also, in the case of a numeric value "1" being set to the Value 461, this indicates that the color gamut of the image data of the video content 450 is sRGB. Further, in the case of a numeric value "2" being set to the Value 461, this indicates that the color gamut of the image data of the video content 450 is AdobeRGB. Also, in the case of a numeric value "3" being set to the Value 461, this indicates that the color gamut of the image data of the video content 450 is WideRGB.

Note that, in the case where the color gamut of image data is not a standard known color gamut, and is not the index specification, a value "FFFF" is set to the Value 461.

Thus, in the case where the value of the Value 461 is "FFFF", and the color gamut of image data is an exceptional color gamut, the range of the color gamut thereof is unknown, and accordingly, specifically what kind of color gamut this is has to be shown. Therefore, as described later, color gamut information is stored in the color gamut body information 452. As described later, only in the case of the color gamut format is not the index specification, this color gamut body information 452 is referenced.

Specifically, an arrangement is made wherein the same information as the index specification is prepared in the header 451 as color gamut specification information, and the device to confirm the color gamut format is allowed to confirm first the index specification. Accordingly, with the Value 461, in the case where the color gamut is specified with the index specification, the device can readily determine the color gamut without referencing other information needlessly.

As described above, the Value 461 is set to the value "FFFF", whereby a color gamut format other than the index specification can also be handled. That is to say, this transmission format is high in versatility as compared to the index specification according to the related art.

Note that in the case where the Value 461 is set to the value "FFFF" (in the case where other than the index specification is specified as a color gamut format), information specifying the address (location) of the color gamut body information 452 is stored in the Address 462.

That is to say, the Value 461 and Address 462 are set to values such as Table 482 shown in FIG. 20B. For example, in a case where the color gamut format of image data to be transmitted is the index specification, the transmission color gamut information generating unit 424 selects a value equivalent to an index in FIG. 5 from the values "0" to "XXX" shown in Table 482, and sets this in the Value 461. At this time, color gamut information does not have to be transmitted, and accordingly, the Address 462 is set to the value "0" indicating that the color gamut body information 452 does not have to be referenced.

Also, for example, in a case where the color gamut format of image data to be transmitted is a format other than the index specification, as shown in Table 482, the transmission color gamut information generating unit 424 sets the Value 461 to the value "FFFF". Also, at this time, color gamut information has to be transmitted, and accordingly, the Address 462 is set to the address of the color gamut body information 452. The color gamut body information 452 can be added to an arbitrary position of the video content 450 by employing the Address 462.

In the case where the value of the Value 461 being "FFFF", the device references the Address 462, and based on the address value thereof references the color gamut body information 452.

Figures 21A, 21B:
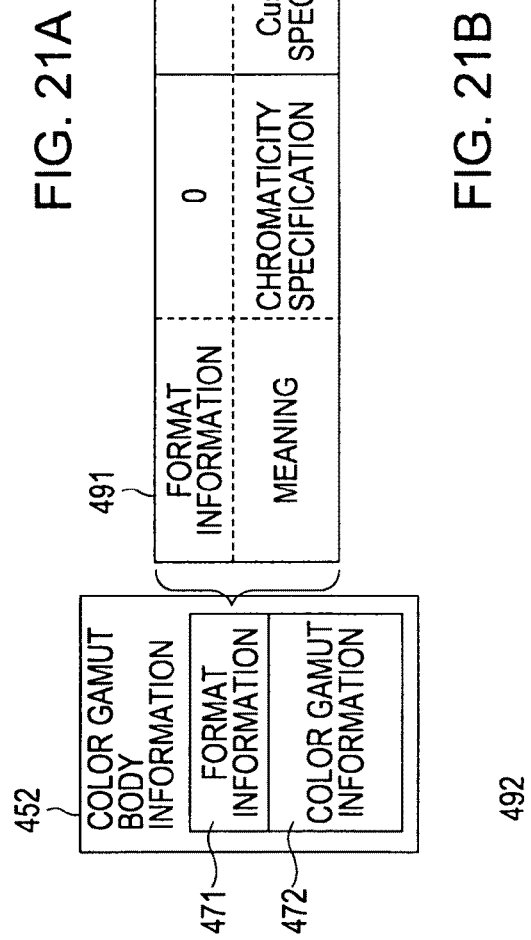
FIGS. 21A and 21B are schematic views for describing color gamut body information.

FIGS. 21A and 21B are diagrams for describing the internal configuration of the color gamut body information 452. As shown in FIG. 21A, identification information for identifying the format of color gamut information (color gamut specifying method) is set to format information 471. Like Table 491 shown in FIG. 21A, identification information (e.g., mutually different value) is each assigned to a predetermined known format (color gamut specifying method). There are various color gamut specifying methods other than the index specification, for example, such as the above-mentioned chromaticity specification, 3D-LUT specification, polygon specification, Cusp table specification, and so forth. For example, a value "0" is assigned to the chromaticity specification, a value "1" is assigned to the Cusp table specification, a value "2" is assigned to the 3D-LUT specification, and a value "3" is assigned to the polygon specification. The transmission color gamut information generating unit 424 selects the numeric value corresponding to the color gamut format of image data from the values thus assigned beforehand, and stores this in the color gamut body information 452 as the format information 471.

Subsequently, the transmission color gamut information generating unit 424 stores the color gamut information of the format specified with the format information 471 in the color gamut body information 452 as the color gamut information 472. For example, the transmission color gamut information generating unit 424 sets the format information 471 and color gamut information 472 such as Table 492 shown in FIG. 21B.

For example, in a case where the format of the color gamut information indicating a color gamut specifying method (color gamut format) is the chromaticity specification, the transmission color gamut information generating unit 424 sets the format information 471 to the value "0", and describes chromaticity information of reference color and white in the color gamut information 472. Also, for example, in a case where the color gamut format is the Cusp table specification, the transmission color gamut information generating unit 424 sets the format information 471 to the value "1", and describes the Cusp table in the color gamut information 472.

Further, for example, in a case where the format of the color gamut information indicating a color gamut specifying method (color gamut format) is the 3D-LUT specification, the transmission color gamut information generating unit 424 sets the format information 471 to the value "2", and describes the 3D-LUT in the color gamut information 472. Also, for example, in a case where the color gamut format is the polygon specification, the transmission color gamut information generating unit 424 sets the format information 471 to the value "3", and describes the table relating to the vertices of a polygon in the color gamut information 472.

Thus, the device to reference the color gamut body information 452 references the format information 471, whereby the device can readily recognize what kind of information is included in the color gamut information 472, and can perform suitable processing based on the content of the color gamut information 472 thereof. If there is no format information 471, the device to reference the color gamut information 472 fails to understand information included in the color gamut information 472 as a predetermined color gamut format. Alternatively, the device to reference the color gamut information 472 has to analyze information included in the color gamut information 472 to determine the color gamut format thereof. That is to say, there is a possibility that the load of processing for recognizing color gamut information may increase, and in the worst case, the device may perform erroneous correspondence as to the content of the color gamut information 472. Consequently, the format information 471 can improve the versatility of the color gamut body information 452.

Though the configuration of the color gamut information 472 is optional, for example, in the case of a Cusp table, there are multiple types of table specification. In the case of such a color gamut format, there is a possibility that the device may fail to recognize information included in the color gamut information 472 (e.g., Cusp table) correctly only by specifying a color gamut format with the format information 471.

FIG. 22 is a diagram illustrating an example of a Cusp table. A Cusp table indicates the information of the highest chroma point (Cusp) with a certain hue of color space, and accordingly, is basically a table of lightness and chroma information with a hue as an index. Therefore, specifications of hue interval, and the type of lightness and chroma information become the point. There are two types depending on whether or not the indexes of hues are provided. Also, there are three types depending on what is employed as chroma information. Consequently, there are 2×3=6 types.

The Cusp table 501 in FIG. 22 has no indexes for hue, and employs color difference (Cb and Cr) as chroma information. The Cusp table 502 has no indexes for hue, and employs chromaticity (C) as chroma information. The Cusp table 503 has no indexes for hue, and employs the absolute value of color difference (|Cb| or |Cr|) as chroma information. The Cusp table 504 has indexes for hue, and employs color difference (Cb and Cr) as chroma information. The Cusp table 505 has indexes for hue, and employs chromaticity (C) as chroma information. The Cusp table 506 has indexes for hue, and employs the absolute value of color difference (|Cb| or |Cr|) as chroma information.

FIG. 23 illustrates a configuration example of the format of the color gamut information 472 for expressing the above-mentioned various Cusp tables correctly. The format 510 shown in FIG. 23 is a format example of the color gamut information 472, digits "0" through "7" arrayed in the lateral direction on the upper portion of the format 510 in the drawing indicate bit numbers, and digits arrayed in the vertical direction on the left portion of the format 510 in the drawing indicate bytes. That is to say, lateral one row of the format 510 indicates the information of one byte.

With the format 510, Color Space of 4-bit information stored in the 0th bit through 3rd bit of the 1st byte is information specifying color space representing a Cusp table. Color space that can express lightness and color difference, and color space that can express hue, lightness, and chroma are all included in Color Space. Bits are assigned to color space such as Table 521 in FIG. 24, for example. With Table 521 in FIG. 24, for example, "0000" are assigned to sYCC space, "0001" are assigned to xvYCC601 space, and "0010" are assigned to xvYCC709 space. Also, for example, "0011" are assigned to YIQ space, "0100" are assigned to YUV space, "0101" are assigned to YPBPR space, and "0110" are assigned to YCBCR space. Further, for example, "0111" are assigned to CIELAB space, "1000" are assigned to CIELUV space, "1001" are assigned to HSV space, and "1010" are assigned to HLS space.

Thus, mutually different bits are assigned to each color space beforehand, whereby color space representing a Cusp table can be indicated with the value stored in color space. Note that, in the case of the example in FIG. 23, color space has 4-bit information, and accordingly, 16 types of color space can be identified. Note that the number of bits for color space is optional, as long as the number of bits has been determined beforehand as a format, 3 bits or less, or 5 bits or more may be assigned to color space.

In FIG. 23, C flag (C-flag) of 3-bit information stored in the 4th through 6th bits of the 1st byte is information for specifying a factor employed as the chroma information of a Cusp table. For example, in a case where color space specified with color space is color space of lightness and color difference base, chroma information is calculated based on the color difference signal thereof, but various types of information can be conceived as chroma information.

In a case where assumption is made that color difference signals are taken as C1 and C2, and chroma information is taken as C, bit assignment as to the calculation method of C corresponding to each type is shown in Table 531 in FIG. 25. With Table 531 in FIG. 25, for example, when color space specified with Color Space is lightness and color difference base, "000" is assigned to the method for calculating the chroma information C by the following Expression (1).

$$C = \mathrm{sqrt}(C1^2 + C2^2) \quad (1)$$

Also, for example, when the color space specified with the Color Space is lightness and color difference base, "001" is assigned to a method employing the color difference signals C1 and C2 as the chroma information C without change.

Further, for example, let us say that the color space specified with the Color Space is lightness and color difference base. At this time, "010" is assigned to a method employing the absolute value of the color difference signal C1 (abs(C1)) or the absolute value of the color difference signal C2 (abs(C2)) as the chroma information C without change.

Also, for example, when the color space specified with the Color Space is hue, chromaticity, and chroma base, "011" is assigned to a method employing the chroma information C as the chroma information C without change.

It goes without saying that a value other than those values is assigned to a method other than those methods. With the example in FIG. 23, the C-flag is 3-bit information, and accordingly, the type of chroma information can be specified from the maximum eight types.

In FIG. 23, the number of hues (HueNum) of 15-bit information stored in the 0th bit through the 6th bit of the 2nd byte and 3rd byte specifies the number of hue steps of the Cusp table, i.e., the number of tables. The value of the number of hues can be specified with a range of "0" through "32768".

A hue flag (H-flag) of 1-bit information stored in the 7th bit of the 3rd byte is flag information specifying whether or not a hue index (hue factor) is included in the Cusp table. For example, in the case where this value is "0", this indicates that hue index specification is not performed with the Cusp table. In this case, the hue value of each table (representative hue) has been determined beforehand (e.g., a representative hue is set with a predetermined interval determined beforehand). Also, in the case where this value is "1", this indicates that hue index specification is performed with the Cusp table.

The number of factors (CompNum) of 3-bit information stored in the 0th bit through 2nd bit of the 4th byte indicates the number of factors of each table data of the Cusp table. This value is calculated based on whether or not a hue index (hue factor) is included (the value of the H-flag), and the type of chroma information (the value of the C-flag). FIG. 26 is a diagram for describing an example of the calculation method of the number of factors (CompNum) thereof. As shown in Table 541 in FIG. 26, the number of factors of each table is determined with regarding whether or not there is a hue factor (the value of the H-flag), and the type of chroma information (the value of the C-flag).

If we say that the number of factors regarding a hue is H_CompNum, in the case of the example in FIG. 26, the value of H_CompNum is "0" when the value of the H-flag is "0", and "1" when the value of the H-flag is "1". Also, if we say that the number of factors regarding chroma information is C_CompNum, in the case of the example in FIG. 26, the value of C_CompNum is "1" when the value of the C-flag is "000", "2" when the value of the C-flag is "001", "1" when the value of the C-flag is "010", and "1" when the value of the C-flag is "011". Also, if we say that the number of factors regarding lightness information (Y) is Y_CompNum, in the case of the example in FIG. 26, the value of Y_CompNum is "1".

Therefore, the value of the number of factors (CompNum) is shown such as the following Expression (2).

$$CompNum = H\_CompNum + C\_CompNum + 1 \quad (2)$$

In FIG. 23, the factor size (CompSize) of 3-bit information stored in the 3rd bit through the 5th bit of the 4th byte indicates the data size of each table data of the Cusp table. The data size is specified with the number of bytes, for example. This is 3-bit information, and accordingly, a range of 0 through 8 bytes can be specified.

The Cusp table data (Cusp Table Data) of the 5th byte and thereafter is a region where the Cusp table is stored based on the information specified up to the 4th byte. The data size (Cusp Table Data Size) of the Cusp table data (Cusp Table Data) is calculated with the following Expression (3).

$$Cusp\ Table\ Data\ Size = CompNum \times CompSize \times HueNum \quad (3)$$

The color gamut information 472 stores various types of Cusp table more accurately by employing the format 510 including various types of information such as described above, whereby a more accurate Cusp table can be provided to a device to reference this color gamut information 472. Note that description has been made so far only regarding the format of the color gamut information 472 in the case of the Cusp table specification. Even in the case of the other color gamut formats, multiple types of table may be expressed correctly.

Next, each process flow will be described. First, description will be made regarding a flow example of the sending processing of content data and color gamut information by the sender 401 in FIG. 15 (FIG. 17), with reference to the flowchart in FIG. 27.

In step S101, the color gamut format determining unit 422 determines the color gamut format of image data included in content data based on the instruction from the user or outside, or the color gamut information of the receiver 403. For example, the color gamut format determining unit 422 accepts the color gamut that the receiver 403 or an output device on the subsequent stage thereof can handle, supplied through the instruction from the user or outside input by the input unit 421, or through the communication unit 426. The color gamut format determining unit 422 selects (generates) a range of the color gamut of image data included in content data, and a method for specifying the range thereof based on such information.

Note that, even in the case of color gamut information being supplied from the receiver 403, the color gamut information is sent with the above-mentioned transmission format, but description regarding the analyzing method of this transmission format will be made with description of the receiver 403 (analyzing is performed with in the same way as with the case performed by the receiver 403). It goes without saying that the transmission method of color gamut information from the receiver 403 to the sender 401 is optional, and color gamut information may be transmitted with a format other than the above-mentioned transmission format. However, the above-mentioned transmission format is employed, thereby improving the versatility of the sending processing (color gamut information can be transmitted to a wider variety of communication partners).

Upon the color gamut format being determined, in step S102 the color gamut processing unit 423 performs color gamut conversion processing such as color gamut compression or the like based on the determined color gamut format as appropriate. For example, in a case where the color gamut determined in step S101 is wide sufficiently so as to completely include the color gamut of image data before color gamut conversion, and color gamut conversion does not have to be performed, color gamut conversion processing will be omitted.

In step S103, the transmission color gamut information generating unit 424 converts the determined color gamut format into a transmission format, thereby generating transmission color gamut information. In step S104, the contents file generating unit 425 employs content data and transmission color gamut information (after color gamut conversion, in the case of color gamut conversion being performed) to generate a content file wherein these are filed.

In step S105, the communication unit 426 packetizes the generated content file, and sends the packet thereof to the receiver 403 through the network 102.

Upon sending being completed, the sender 401 ends the sending processing.

Next, description will be made regarding a flow example of transmission color gamut information generating processing executed in step S103 in FIG. 27, with reference to the flowchart in FIG. 28.

In step S201, the transmission color gamut information generating unit 424 determines whether or not the color gamut format determined in step S101 in FIG. 27 (the method for specifying the range of a color gamut) is the index specification such as described with reference to FIG. 5. In the case where determination is made here that the color gamut format is the index specification, the processing proceeds to step S202.

In step S202, the transmission color gamut information generating unit 424 sets the Value 461 of the color gamut specification information 460 to the index value assigned to the determined color gamut based on predetermined correlationship such as Table 481 in FIG. 20A determined beforehand. The correlationship between the index value and color gamut may be recognized at the transmission color gamut information generating unit 424 beforehand, or may be supplied to the transmission color gamut information generating unit 424 along with the color gamut format.

In the case of the index specification, the specification of color gamut type by employing an index value is also the specification of color gamut range without change (color gamut range is known), and accordingly, the color gamut range does not have to be specified again. Accordingly, in step S203, the transmission color gamut information generating unit 424 sets the Address 462 of the color gamut specification information 460 to a value "0" indicating that a color gamut range is not specified (the color gamut body information 452 is not generated). That is to say, in the case of the index specification, the transmission color gamut information generating unit 424 generates the color gamut specification information 460 alone. Therefore, upon the processing in step S203 being completed, the transmission color gamut information generating unit 424 ends the transmission color gamut information generating processing, the processing is returned to step S103 in FIG. 27, where the processing in step S104 and thereafter will be executed.

In the case where determination is made in step S201 that the color gamut format is not the index specification, the processing proceeds to step S204.

In step S204, the transmission color gamut information generating unit 424 sets the Value 461 of the color gamut specification information 460 to a value "FFFF" indicating that the color gamut format is a format other than the index specification. In step S205, the transmission color gamut information generating unit 424 sets the Address 462 of the color gamut specification information 460 to the address of the color gamut body information 452. Note that this address indicates the position of the color gamut body information 452, and accordingly, in a case where this storage position has not been determined at this stage, the transmission color gamut information generating unit 424 sets the Address 462 to blank space (or a value indicating vacancy). In this case, the value of the Address 462 is set again at the time of the color gamut body information 452 being added actually at the contents file generating unit 425. On the other hand, in the case where the position of the color gamut body information 452 is known beforehand, in step S205 the transmission color gamut information generating unit 424 sets a value indicating a specific address.

Figure 27:
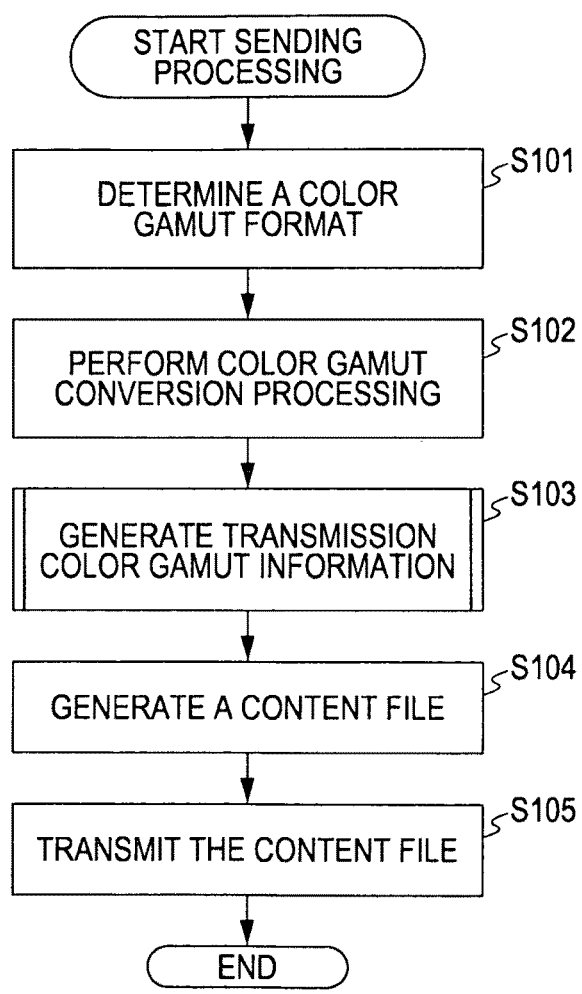
FIG. 27 is a flowchart for describing a flow example of sending processing.
Figure 28:
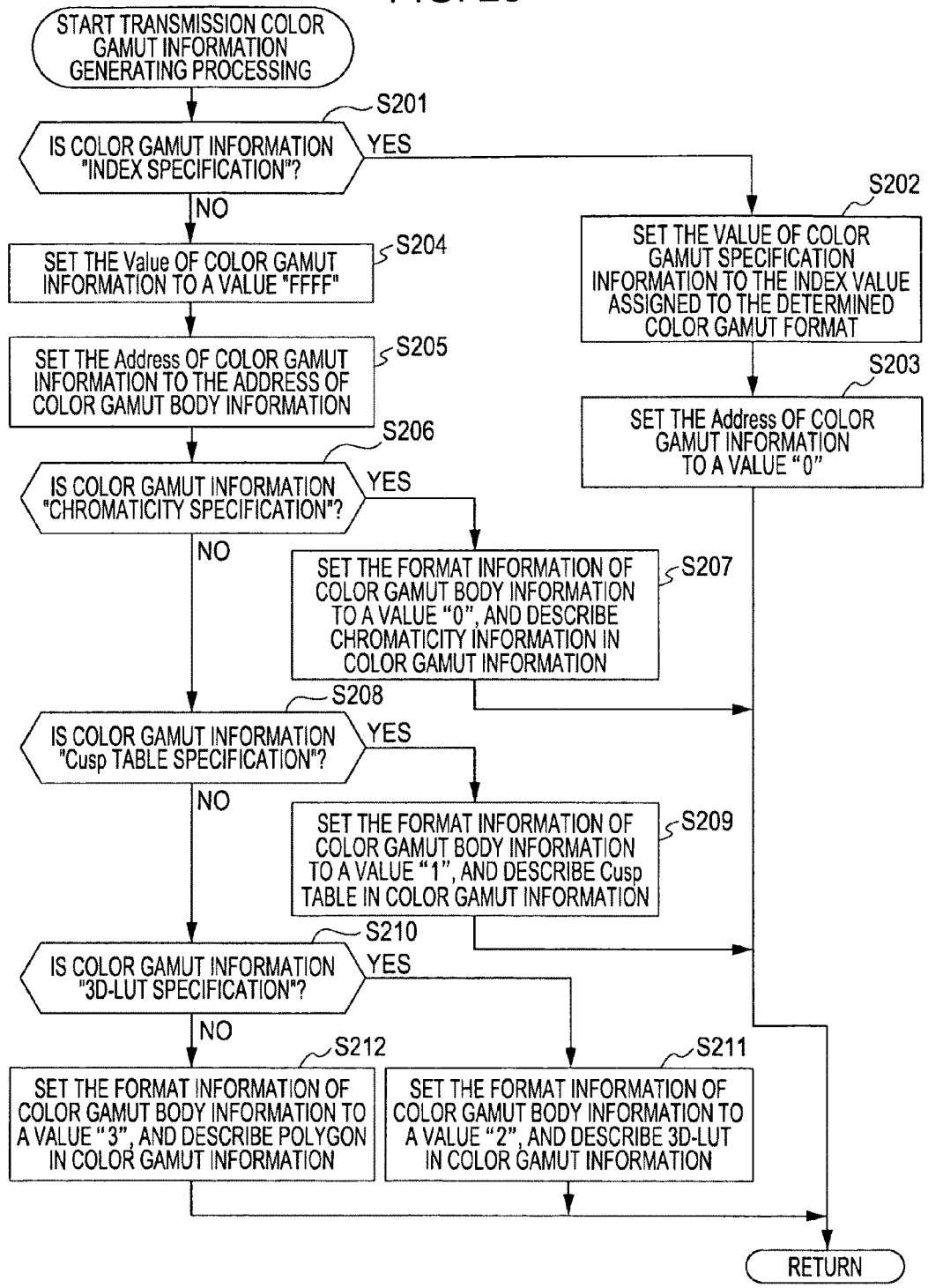
FIG. 28 is a flowchart for describing a flow example of transmission color gamut information generating processing.

In step S206, the transmission color gamut information generating unit 424 determines whether or not the color gamut format determined in step S101 in FIG. 27 is the chromaticity specification. In the case where determination is made that the color gamut format is the chromaticity specification, the processing proceeds to step S207.

In step S207, the transmission color gamut information generating unit 424 sets the format information 471 of the color gamut body information 452 to the value "0" indicating the chromaticity specification based on the predetermined correlationship, and describes chromaticity information in the color gamut information 472.

For example, the transmission color gamut information generating unit 424 sets the format information 471 to the value "0" indicating the chromaticity specification based on the predetermined correlationship such as the example shown in Table 491 in FIG. 21A. Also, the transmission color gamut information generating unit 424 describes information indicating a color gamut range specifically in the color gamut information 472 such as Table 111 shown in FIG. 6, for example.

More specifically, the transmission color gamut information generating unit 424 describes used information such as information indicating the range of a color gamut, setting information relating to the color gamut thereof, and so forth in accordance with the format described with reference to FIG. 23. As described above, upon generating the color gamut specification information 460 and color gamut body information 452, the transmission color gamut information generating unit 424 ends the transmission color gamut information generating processing, the processing is returned to step S103 in FIG. 27, where the processing in step S104 and thereafter is executed.

In the case where determination is made in step S206 that the color gamut format is not the chromaticity specification, the processing proceeds to step S208. In step S208, the transmission color gamut information generating unit 424 determines whether or not the color gamut format determined in step S101 in FIG. 27 is the Cusp table specification. In the case where determination is made that the color gamut format is the Cusp table specification, the processing proceeds to step S209.

In step S209, the transmission color gamut information generating unit 424 sets the format information 471 of the color gamut body information 452 to the value "1" indicating the Cusp table specification based on the predetermined correlationship such as the example shown in Table 491 in FIG. 21A. Also, the transmission color gamut information generating unit 424 describes a Cusp table (e.g., information indicating a color gamut range specifically such as Cusp Tables 501 through 506 shown in FIG. 22) in the color gamut information 472. More specifically, the transmission color gamut information generating unit 424 describes used information such as information indicating the range of a color gamut, setting information relating to the color gamut thereof, and so forth in accordance with the format described with reference to FIG. 23. As described above, upon generating the color gamut specification information 460 and color gamut body information 452, the transmission color gamut information generating unit 424 ends the transmission color gamut information generating processing, the processing is returned to step S103 in FIG. 27, where the processing in step S104 and thereafter is executed.

In the case where determination is made in step S208 that the color gamut format is not the Cusp table specification, the processing proceeds to step S210. In step S210, the transmission color gamut information generating unit 424 determines whether or not the color gamut format determined in step S101 in FIG. 27 is the 3D-LUT specification. In the case where determination is made that the color gamut format is the 3D-LUT specification, the processing proceeds to step S211.

In step S211, the transmission color gamut information generating unit 424 sets the format information 471 of the color gamut body information 452 to the value "2" indicating the 3D-LUT specification based on the predetermined correlationship such as the example shown in Table 491 in FIG. 21A. Also, the transmission color gamut information generating unit 424 describes a 3D-LUT (e.g., information indicating a color gamut range specifically such as Table 131 shown in FIG. 8) in the color gamut information 472. More specifically, the transmission color gamut information generating unit 424 describes used information such as information indicating the range of a color gamut, setting information relating to the color gamut thereof, and so forth in accordance with the format described with reference to FIG. 23. As described above, upon generating the color gamut specification information 460 and color gamut body information 452, the transmission color gamut information generating unit 424 ends the transmission color gamut information generating processing, the processing is returned to step S103 in FIG. 27, where the processing in step S104 and thereafter is executed.

In the case where determination is made in step S210 that the color gamut format is not the 3D-LUT specification, determination is made that the color gamut format is the polygon specification, and the processing proceeds to step S212.

In step S212, the transmission color gamut information generating unit 424 sets the format information 471 of the color gamut body information 452 to the value "3" indicating the polygon specification based on the predetermined correlationship such as the example shown in Table 491 in FIG. 21A. Also, the transmission color gamut information generating unit 424 describes a polygon table (e.g., information indicating a color gamut range specifically such as Tables 141 and 142 shown in FIG. 9A) in the color gamut information 472. More specifically, the transmission color gamut information generating unit 424 describes used information such as information indicating the range of a color gamut, setting information relating to the color gamut thereof, and so forth in accordance with the format described with reference to FIG. 23. As described above, upon generating the color gamut specification information 460 and color gamut body information 452, the transmission color gamut information generating unit 424 ends the transmission color gamut information generating processing, the processing is returned to step S103 in FIG. 27, where the processing in step S104 and thereafter is executed.

As described above, the color gamut information of a higher-versatile transmission format is created, whereby the sender 401 can provide a color gamut more suitable for image data to be processed.

Figure 29:
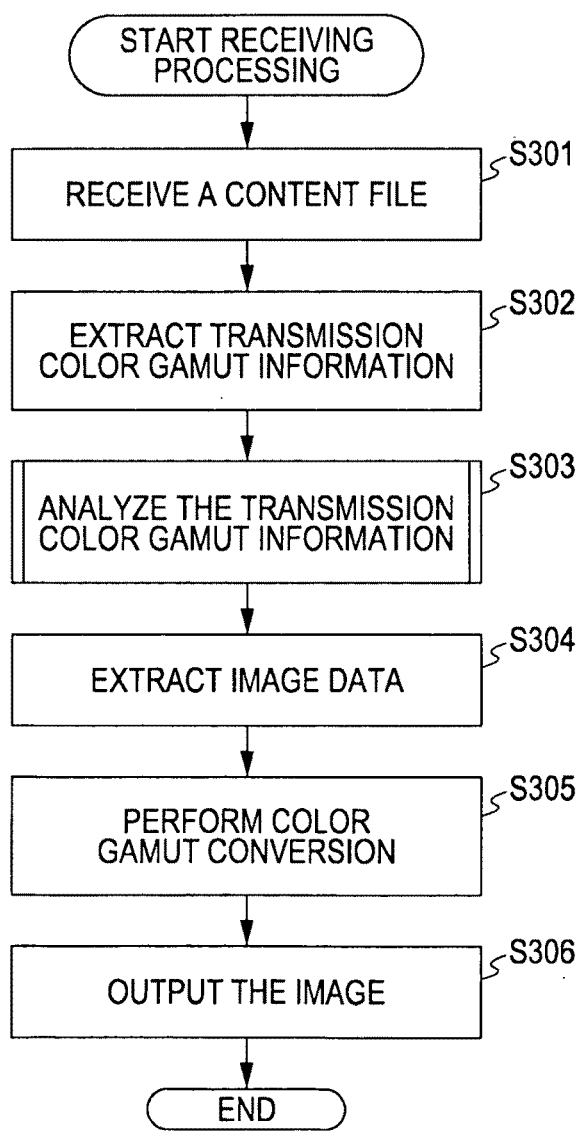
FIG. 29 is a flowchart for describing a flow example of receiving processing.

Next, description will be made regarding a flow example of the receiving processing by the receiver 403 (FIG. 18) in FIG. 15 which receives color gamut information to be transmitted with such a transmission format, with reference to the flowchart in FIG. 29.

Upon starting the receiving processing, in step S301 the communication unit 441 of the receiver 403 receives the content file sent from the sender 401. In reality, the content file is packetized and sent, and accordingly, the communication unit 441 receives the packet thereof, extracts the data of the content file from the packet thereof, and assembles the content file. Upon receiving the content file, in step S302 the communication unit 441 extracts the transmission color gamut information stored in the content file thereof.

In step S303, the transmission color gamut information analyzing unit 443 analyzes the extracted transmission color gamut information (the color gamut information of the above-mentioned transmission format) to recognize the color gamut of image data included in content data. In step S304, the contents processing unit 444 extracts image data from the content data extracted from the content file by the communication unit 441.

In step S305, the color gamut processing unit 445 performs color gamut conversion of image data based on a color gamut that the receiver 403 (or output device on the subsequent stage) can express, and the color gamut of the image data analyzed by the transmission color gamut information analyzing unit 443, as appropriate.

In step S306, the output unit 446 outputs the image to a monitor (or image data to an external device). Upon the processing in step S306 being completed, the receiver 403 ends the receiving processing.

Figure 30:
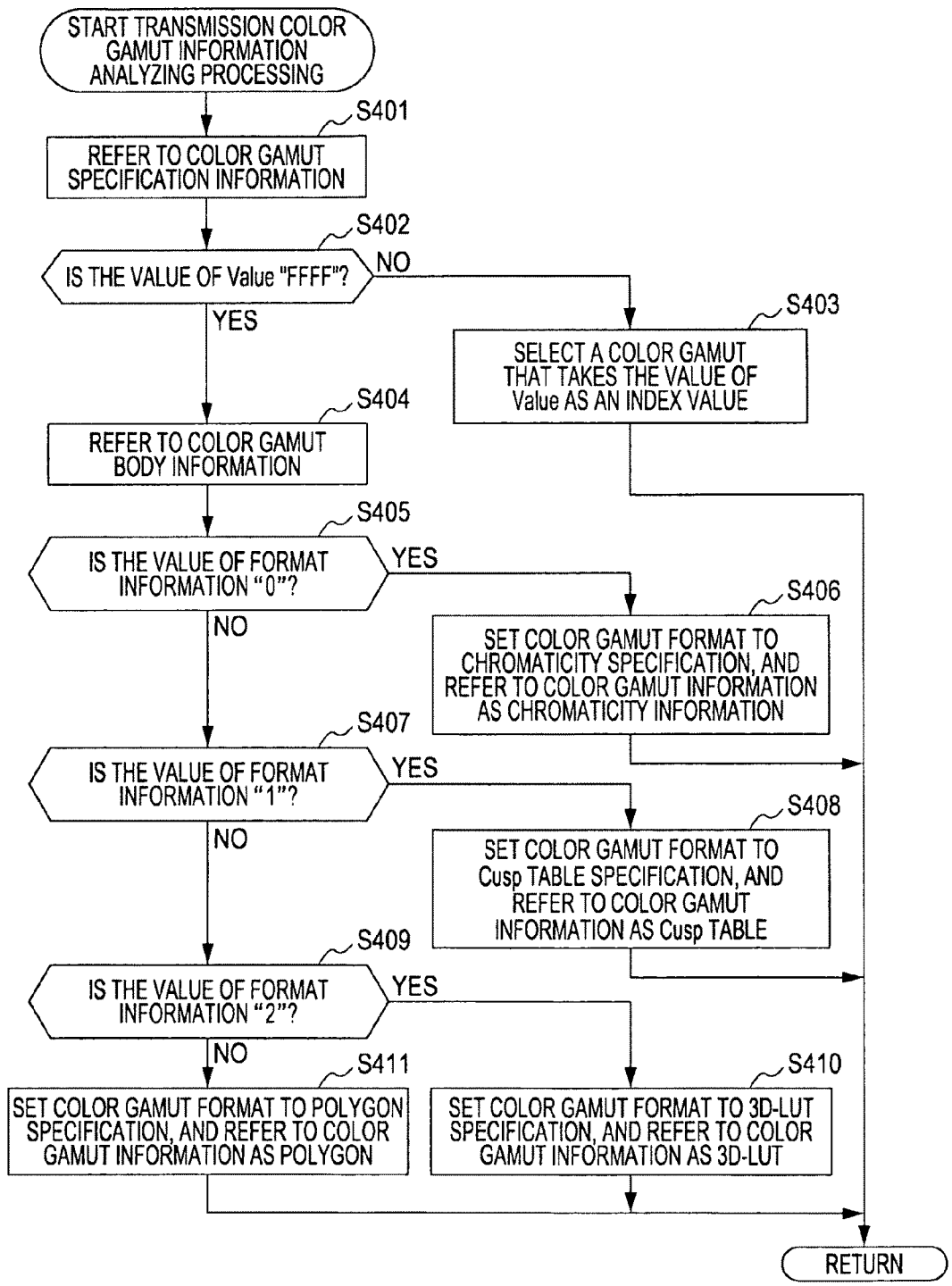
FIG. 30 is a flowchart for describing a flow example of transmission color gamut information analyzing processing.

Next, description will be made regarding a flow example of the transmission color gamut information analyzing processing executed in step S303 in FIG. 29, with reference to the flowchart in FIG. 30.

In step S401, the transmission color gamut information analyzing unit 443 refers to the color gamut specification information 460, of the transmission color gamut information. In step S402, the transmission color gamut information analyzing unit 443 determines whether or not the value of the Value 461 is "FFFF" indicating a color gamut format other than the index specification. In the case where determination is made that the value of the Value 461 is not "FFFF", and the color gamut format is the index specification, the processing proceeds to step S403.

In step S403, the transmission color gamut information analyzing unit 443 selects the color gamut with the value of the Value 461 as an index value (versatile known color gamut). Upon selecting the color gamut, the transmission color gamut information analyzing unit 443 ends the transmission color gamut information analyzing processing.

Also, in the case where determination is made in step S402 that the value of the Value 461 is not "FFFF", the processing proceeds to step S404. In step S404, the transmission color gamut information analyzing unit 443 refers to the color gamut body information 452 of the transmission color gamut information, and in step S405 determines whether or not the value of the format information 471 is "0". In the case where determination is made that the value of the format information 471 is "0", the processing proceeds to step S406.

In step S406, the transmission color gamut information analyzing unit 443 sets the color gamut format to the chromaticity specification, and refers to the color gamut information 472 assuming that chromaticity information (table information specifying the range of a color gamut by employing chromaticity) is included in the color gamut information 472. Upon recognizing the color gamut based on the chromaticity information thereof, the transmission color gamut information analyzing unit 443 ends the transmission color gamut information analyzing processing.

Also, in the case where determination is made in step S405 that the value of the format information 471 is not "0", the processing proceeds to step S407. In step S407, the transmission color gamut information analyzing unit 443 determines whether or not the value of the format information 471 is "1". In the case where determination is made that the value of the format information 471 is "1", the processing proceeds to step S408.

In step S408, the transmission color gamut information analyzing unit 443 sets the color gamut format to the Cusp table specification, and refers to the color gamut information 472 assuming that a Cusp table is included in the color gamut information 472. Upon recognizing the color gamut based on the Cusp table thereof, the transmission color gamut information analyzing unit 443 ends the transmission color gamut information analyzing processing.

Also, in the case where determination is made in step S407 that the value of the format information 471 is not "1", the processing proceeds to step S409. In step S409, the transmission color gamut information analyzing unit 443 determines whether or not the value of the format information 471 is "2". In the case where determination is made that the value of the format information 471 is "2", the processing proceeds to step S410.

In step S410, the transmission color gamut information analyzing unit 443 sets the color gamut format to the 3D-LUT specification, and refers to the color gamut information 472 assuming that a 3D-LUT is included in the color gamut information 472. Upon recognizing the color gamut based on the 3D-LUT thereof, the transmission color gamut information analyzing unit 443 ends the transmission color gamut information analyzing processing.

Also, in the case where determination is made in step S409 that the value of the format information 471 is not "2", the processing proceeds to step S411.

In step S411, the transmission color gamut information analyzing unit 443 sets the color gamut format to the polygon specification, and refers to the color gamut information 472 assuming that table information specifying the range of a color gamut is included by employing the vertices of a polygon. Upon recognizing the color gamut based on the table information thereof, the transmission color gamut information analyzing unit 443 ends the transmission color gamut information analyzing processing.

As described above, the transmission color gamut information analyzing unit 443 refers to the color gamut information of the transmission format, whereby the color gamut of image data can be readily recognized without complicated conversion processing and so forth. Also, only the used portion of the transmission color gamut information should be referred, whereby the transmission color gamut information analyzing unit 443 can suppress needless increase in load due to the processing for recognizing the color gamut of image data.

Description has been made so far wherein the transmission system 400 is configured of the sender 401, network 402, and receiver 403, but the configuration of the transmission system 400 is optional. For example, the transmission system 400 may include multiple senders 401. This is also true for the receiver 403. Alternatively, the sender 401 and receiver 403 may be connected through multiple networks 402. Alternatively, the transmission system 400 may include another configuration other than described above.

Also, description has been made so far wherein one color gamut is transmitted with the transmission format, but multiple color gamuts may be included in the above-mentioned transmission format. In this case, an arrangement should be made wherein multiple color gamuts are specified with the color gamut specification information 460, and used color gamut information is included in the color gamut body information 452. Further, in this case, the color gamut formats of the color gamuts may be the same mutually, or may differ mutually (or may include the color gamut of a color gamut format different from the others).

Note that the above-mentioned series of processing can be executed not only by hardware but also by software. In this case, for example, the above-mentioned series of processing may be configured as a personal computer such as shown in FIG. 31.

In FIG. 31, the CPU 601 of a personal computer 600 executes various types of processing in accordance with a program stored in ROM 602, or a program loaded from a storage unit 613 to RAM 603. Data and so forth used by the CPU 601 executing various types of processing is also stored in the RAM 603 as appropriate. The CPU 601, ROM 602, and RAM 603 are connected mutually through a bus 604. An input/output interface 610 is also connected to the bus 604.

An input unit 611 made up of a keyboard, mouse, and so forth, and an output unit 612 made up of a display made up of CRT (Cathode Ray Tube), LCD (Liquid Crystal Display) or the like, speakers, and so forth are connected to the input/output interface 610. A storage unit 613 made up of a hard disk or the like, and a communication unit 614 made up of a modem or the like, are also connected to the input/output interface 610. The communication unit 614 performs communication processing through a network including the Internet.

A drive 615 is also connected to the input/output interface 610 as appropriate. A removable medium 621 such as a magnetic disk, optical disc, magneto-optical disk, semiconductor memory, or the like is mounted to the drive 615 as appropriate, and a computer program read out therefrom is installed to the storage unit 613 as appropriate.

In a case where the above-mentioned series of processing are executed by software, a program making up the software thereof is installed from a network or recording medium. This recording medium is, for example, as shown in FIG. 31, distributed separately from the device main body to distribute the program to a user. This recording medium is configured of, for example, a magnetic disk (including a flexible disk) or optical disc (including CD-ROM (Compact Disk-Read Only Memory) and DVD (Digital Versatile Disk)), in which the program is recorded. Also, this recording medium may be configured of the removable medium 621 made up of, for example, a magneto-optical disk (including MD (Mini-Disk)), semiconductor memory, or the like. Further, this recording medium may be configured of, for example, the ROM 602 in which the program is recorded, to be distributed to a user in a state built into the device main body beforehand, or a hard disk or the like included in the storage unit 613.

Note that, with the present Specification, steps describing the program recorded in the recording medium are not restricted to processing being performed in time sequence in accordance with the described sequence but also processing not necessarily performed in time sequence but rather performed in parallel or individually.

Note that the configuration described above so far as one device may be configured as multiple devices by being divided. Conversely, the configurations described above so far as multiple devices may be configured as a single device by being integrated. Also, it goes without saying that a configuration other than described above may be added to the configuration of each device. Further, a portion of the configuration of a certain device may be included in the configuration of another device as long as the configuration and operation as the whole system are substantially the same. That is to say, an embodiment of the present invention is not restricted to the above-mentioned embodiment, and various changes can be made without departing from the essence and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
    color gamut information generating means configured to generate color gamut information representing the color gamut of image data based on table information indicating the highest chroma point at each equal hue plane regarding a plurality of equal hue planes,
    wherein, for each hue plane, the color gamut information generating means approximates a color gamut shape using a triangle connecting a white point, a black point, and the highest chroma point; and transmission color gamut information generating means configured to generate transmission color gamut information that is the color gamut information in a transmission format by employing the color gamut information generated by said color gamut information generating means, wherein the transmission color gamut information includes color gamut specification information including the basic information of the color gamut and color gamut body information including the detailed information of the color gamut, and the color gamut specification information includes index information specifying a color gamut other than a known color gamut.

2. The information processing device according to claim 1, wherein said table information represents said highest chroma point at each equal hue plane by employing a lightness value and a chroma value.

3. The information processing device according to claim 1, wherein said table information represents said highest chroma point at each equal hue plane by employing a lightness value and a color difference.

4. The information processing device according to claim 1, wherein said table information includes the hue of said equal hue plane indicating said highest chroma point as an index.

5. The information processing device according to claim 1, further comprising:
color gamut conversion means configured to convert the color gamut of said image data by employing said color gamut information generated by said color gamut information generating means.

6. The information processing device according to claim 1, wherein said color gamut body information includes said color gamut information, and information specifying a specifying method of the range of said color gamut with said color gamut information.

7. The information processing device according to claim 1, further comprising:
sending means configured to send said image data, and said transmission color gamut information generated by said transmission color gamut information generating means to another device.

8. The information processing device according to claim 1, wherein the color gamut other than the known color gamut is a synthetic color gamut formed of multiple color gamuts.

9. A non-transitory computer readable medium having recorded therein a computer program for causing a computer to execute an information processing method, said information processing method comprising:
generating color gamut information representing the color gamut of image data based on table information indicating the highest chroma point at each equal hue plane regarding a plurality of equal hue planes;
approximating, for each hue plane, a color gamut shape using a triangle connecting a white point, a black point, and the highest chroma point, and
generating transmission color gamut information that is the color gamut information in a transmission format by employing the generated color gamut information,
wherein the transmission color gamut information includes color gamut specification information including the basic information of the color gamut and color gamut body information including the detailed information of the color gamut, and the color gamut specification information includes index information specifying a color gamut other than a known color gamut.

10. The non-transitory computer readable medium according to claim 9, wherein the color gamut other than the known color gamut is a synthetic color gamut formed of multiple color gamuts.

11. An information processing device, comprising:
a processor configured to operate as:
a color gamut information generating unit that generates color gamut information representing the color gamut of image data based on table information indicating the highest chroma point at each equal hue plane regarding a plurality of equal hue planes, and for each hue plane, approximates a color gamut shape using a triangle connecting a white point, a black point, and the highest chroma point; and
a transmission color gamut information unit that generates transmission color gamut information that is the color gamut information in a transmission format by employing the color gamut information generated by the color gamut information generating unit,
wherein the transmission color gamut information includes color gamut specification information including the basic information of the color gamut and color gamut body information including the detailed information of the color gamut, and the color gamut specification information includes index information specifying a color gamut other than a known color gamut.

12. The information processing device according to claim 11, wherein the color gamut other than the known color gamut is a synthetic color gamut formed of multiple color gamuts.

13. An information processing method, comprising:
using a processor to carry out the following:
generating color gamut information representing the color gamut of image data based on table information indicating the highest chroma point at each equal hue plane regarding a plurality of equal hue planes,
approximating, for each hue plane, a color gamut shape using a triangle connecting a white point, a black point, and the highest chroma point, and
generating transmission color gamut information that is the color gamut information in a transmission format by employing the generated color gamut information,
wherein the transmission color gamut information includes color gamut specification information including the basic information of the color gamut and color gamut body information including the detailed information of the color gamut, and the color gamut specification information includes index information specifying a color gamut other than a known color gamut.

14. The information processing method according to claim 13, wherein the color gamut other than the known color gamut is a synthetic color gamut formed of multiple color gamuts.

* * * * *